(12) United States Patent
Ciliberti et al.

(10) Patent No.: US 12,073,212 B2
(45) Date of Patent: *Aug. 27, 2024

(54) SYSTEMS AND METHODS FOR PROVIDING STABLE DEPLOYMENTS TO MAINFRAME ENVIRONMENTS

(71) Applicant: Express Scripts Strategic Development, Inc., St. Louis, MO (US)

(72) Inventors: John Ciliberti, Sparta, NJ (US); Alexander Tyshlek, Overland Park, KS (US); Imran Ali Mohammed, Parsippany, NJ (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,858

(22) Filed: Jun. 20, 2023

(65) Prior Publication Data

US 2023/0333846 A1    Oct. 19, 2023

Related U.S. Application Data

(63) Continuation of application No. 17/118,734, filed on Dec. 11, 2020, now Pat. No. 11,720,347, which is a continuation-in-part of application No. 16/438,660, filed on Jun. 12, 2019, now Pat. No. 11,086,757.

(51) Int. Cl.
*G06F 8/71* (2018.01)
*G06F 8/72* (2018.01)
*G06F 9/30* (2018.01)

(52) U.S. Cl.
CPC .................. *G06F 8/71* (2013.01); *G06F 8/72* (2013.01); *G06F 9/3005* (2013.01)

(58) Field of Classification Search
CPC ............. G06F 8/71; G06F 8/72; G06F 9/3005
See application file for complete search history.

(56) References Cited

U.S. PATENT DOCUMENTS

| | | | |
|---|---|---|---|
| 8,225,281 B1 | 7/2012 | Hardinger | |
| 8,245,192 B1 * | 8/2012 | Chen | G06F 8/71 717/122 |
| 8,336,030 B1 * | 12/2012 | Boissy | G06F 11/368 717/122 |
| 8,677,315 B1 | 3/2014 | Anderson | |
| 8,732,693 B2 | 5/2014 | Mutisya | |

(Continued)

*Primary Examiner* — Douglas M Slachta
(74) *Attorney, Agent, or Firm* — Stinson LLP

(57) ABSTRACT

A quality assurance system includes a mainframe deployment device in communication with a mainframe device with a codebase. The mainframe deployment device initializes a branch repository corresponding to a code region of the codebase, identifies, for a code element of the code region, a timestamp indicating a creation time and a user identifier indicating an owner, populates the branch repository with the code element based on the code region and the timestamp, applies a code security scan to the branch repository to identify and resolve a code security issue, and applies a code quality scan to the branch repository to identify a code quality issue in the code element, assign the code element to the user identifier based at least partially on the timestamp, and route the code element along with information regarding the code quality issue to correct the code quality issue in the code element.

20 Claims, 21 Drawing Sheets

(56) References Cited

U.S. PATENT DOCUMENTS

| | | | | |
|---|---|---|---|---|
| 8,918,837 | B2 * | 12/2014 | Li | G06F 21/566 726/1 |
| 8,924,935 | B1 | 12/2014 | Chopra | |
| 8,965,840 | B2 | 2/2015 | Hagan | |
| 9,038,055 | B2 | 5/2015 | Mutisya | |
| 9,081,595 | B1 | 7/2015 | Delarue | |
| 9,135,405 | B2 | 9/2015 | Brumley | |
| 9,280,450 | B2 | 3/2016 | Wong | |
| 9,383,984 | B2 | 7/2016 | Mantripragada | |
| 9,405,523 | B2 | 8/2016 | Choi | |
| 9,678,743 | B2 | 6/2017 | Fox | |
| 9,727,318 | B2 | 8/2017 | Naveh | |
| 9,727,736 | B1 | 8/2017 | McClintock | |
| 9,767,001 | B2 | 9/2017 | Wong | |
| 9,898,582 | B2 | 2/2018 | Reddy | |
| 9,940,114 | B2 | 4/2018 | Mantripragada | |
| 9,940,219 | B2 | 4/2018 | Bigwood | |
| 10,180,836 | B1 * | 1/2019 | Arguelles | G06F 8/75 |
| 10,540,157 | B2 | 1/2020 | Madison | |
| 10,545,755 | B2 | 1/2020 | Garay | |
| 10,585,666 | B2 | 3/2020 | Antons | |
| 10,606,613 | B2 | 3/2020 | Iley | |
| 10,740,093 | B2 | 8/2020 | Lai | |
| 10,809,984 | B2 | 10/2020 | Mizrahi | |
| 10,846,081 | B2 | 11/2020 | Sigmon | |
| 10,853,095 | B2 | 12/2020 | Iley | |
| 11,720,347 | B1 * | 8/2023 | Ciliberti | G06F 9/3005 717/124 |
| 2005/0044187 | A1 | 2/2005 | Jhaveri | |
| 2006/0106879 | A1 | 5/2006 | Zondervan | |
| 2007/0101256 | A1 | 5/2007 | Simonyi | |
| 2007/0130217 | A1 | 6/2007 | Linyard | |
| 2007/0294685 | A1 | 12/2007 | Oh | |
| 2008/0201362 | A1 | 8/2008 | Multer | |
| 2011/0055798 | A1 * | 3/2011 | Kraft | G06F 11/3604 717/100 |
| 2011/0088013 | A1 | 4/2011 | Vinay | |
| 2011/0126197 | A1 | 5/2011 | Larsen | |
| 2011/0179280 | A1 | 7/2011 | Imrey | |
| 2011/0218964 | A1 | 9/2011 | Hagan | |
| 2011/0321007 | A1 | 12/2011 | Marum | |
| 2012/0131387 | A1 | 5/2012 | Salloum | |
| 2012/0317554 | A1 | 12/2012 | Mulat | |
| 2013/0031423 | A1 | 1/2013 | Barrow | |
| 2013/0036400 | A1 | 2/2013 | Bak | |
| 2013/0159365 | A1 | 6/2013 | Boctor | |
| 2013/0174124 | A1 | 7/2013 | Watters | |
| 2014/0068554 | A1 | 3/2014 | Novak | |
| 2014/0181789 | A1 | 6/2014 | Canter | |
| 2015/0106790 | A1 * | 4/2015 | Bigwood | G06F 11/3624 717/127 |
| 2015/0205600 | A1 | 7/2015 | Grillo | |
| 2015/0339207 | A1 | 11/2015 | Hod | |
| 2016/0170746 | A1 | 6/2016 | Neubeck | |
| 2016/0364566 | A1 * | 12/2016 | Li | G06F 21/54 |
| 2017/0169370 | A1 | 6/2017 | Cornilescu | |
| 2017/0192873 | A1 | 7/2017 | Ozdemir | |
| 2017/0316213 | A1 * | 11/2017 | McClintock | G06F 21/577 |
| 2017/0372247 | A1 | 12/2017 | Tauber | |
| 2018/0121174 | A1 | 5/2018 | Phillips | |
| 2018/0129497 | A1 * | 5/2018 | Biddle | G06F 11/3668 |
| 2018/0150345 | A1 | 5/2018 | Porwal | |
| 2018/0198814 | A1 * | 7/2018 | Brodie | G06F 21/57 |
| 2018/0239898 | A1 | 8/2018 | Haerterich | |
| 2018/0285103 | A1 | 10/2018 | Jha | |
| 2018/0300227 | A1 | 10/2018 | Bergen | |
| 2018/0307580 | A1 * | 10/2018 | Potts | G06Q 10/06393 |
| 2018/0321918 | A1 | 11/2018 | McClory | |
| 2018/0351989 | A1 | 12/2018 | Nazir | |
| 2018/0373770 | A1 | 12/2018 | Switzer | |
| 2019/0026697 | A1 | 1/2019 | Burton | |
| 2019/0243742 | A1 | 8/2019 | Natari | |
| 2019/0294428 | A1 | 9/2019 | Scheiner | |
| 2019/0294526 | A1 * | 9/2019 | Hayward | G06F 21/577 |
| 2020/0110600 | A1 * | 4/2020 | Weldemariam | G06N 3/04 |
| 2020/0250070 | A1 | 8/2020 | Willson | |

* cited by examiner

SYSTEMS AND METHODS FOR PROVIDING STABLE DEPLOYMENTS TO MAINFRAME ENVIRONMENTS

CROSS REFERENCE TO RELATED APPLICATIONS

This application is a continuation of U.S. patent application Ser. No. 17/118,734 filed Dec. 11, 2020, which is a continuation-in-part of U.S. patent application Ser. No. 16/438,660 filed Jun. 12, 2019, both of which are incorporated by reference herein in their respective entireties for all purposes.

FIELD OF INVENTION

The field relates to deployments of software programs in mainframe environments. More specifically, the field of the invention is related to deployment stability and reliability in such mainframe environments. Further, the field of invention includes providing improved models to improve code quality, scalability, and security of mainframe codebases in an automated fashion.

BACKGROUND OF THE DISCLOSURE

Continuous integration and continuous delivery ("CICD") is an important approach to modern software development. CICD employs methods to break down the historically strict and rigid phases and checkpoints of software development and to allow for continuous development with minimal delay. While CICD has become favored in many development environments, applying CICD to mainframe contexts is particularly challenging. Indeed, applying CICD to mainframes is frequently unreliable and involves risks at each and every step of the process.

For example, there are risks that development builds are unstable, that development builds are not deployable to a mainframe, that development builds cannot pass phases for coverage and testing, that packages cannot be successfully created, and that packages cannot execute on a mainframe. These risks undermine the central purpose of CICD—to allow for continuous integration and development. Instead, the risks pose significant threats of delays in software release because steps may need to be repeated. Further, mainframes are frequently used for business critical software projects. As such, these risks are amplified because the dangers of delayed deployments are often unacceptable in mainframe environments.

In addition to threatening to delay deployments, there are significant risks associated with deploying unstable software onto mainframes. If an unstable build is deployed into release, it may result in system failures which can negatively impact critical activities. Because of the roles of mainframes in production environments, such failures can have significant costs. In addition, such failures are time-consuming and expensive to resolve, while simultaneously wasting valuable time on the mainframe.

In many examples, mainframe codebases are unable to leverage or otherwise utilize modern software development techniques because of their contexts. Most notably, providing crucial code reviews, debugging, and other quality assurance tasks is difficult or impossible to do for mainframe codebases in their native contexts. As a result, mainframe codebases frequently become poorly maintained, difficult to utilize, and pose serious risks of performance problems or failure. Yet, because mainframe code is often utilized in business critical applications, enterprise systems are posed with difficult problems. Using known techniques, such organizations can either perform quality assurance operations on mainframe codebases in their native contexts and expend significant resources or they can end-of-life mainframe code bases. Neither approach is desirable because of the impact it may have to other enterprise systems or resource utilization. Further, the process of leveraging legacy codebases from mainframes may include additional risks because such codebases may include sensitive information that could pose security risks if the sensitive information is made accessible.

Accordingly, a solution to these technical problems is desired that can provide CICD approaches to mainframes while improving the reliability and the stability of the deployments. Further, a solution is desired that improves maintainability, quality, and security of mainframe codebases without requiring substantial overhead.

BRIEF SUMMARY OF THE INVENTION

In one aspect, a mainframe deployment system is provided for deploying code to a mainframe device in a stable, self-correcting manner. The mainframe deployment system includes at least a software management device, a dispatcher device, at least one testing service, a mainframe device, and a mainframe deployment device including a processor and a memory device. The processor of the mainframe deployment device is configured to (a) receive a code section from the software management device, wherein the code section includes a status identifier, (b) upon determining that the status identifier is complete, identify a set of valid sub-components from the code section using a dispatcher service associated with the dispatcher device, (c) upon determining that the identified set of valid sub-components are capable of creating a build, identify a set of elements in the code section identified for deployment, (d) upon determining that the set of elements in the code section are deployable, request the at least one testing service to perform at least one set of code diagnostics to determine whether the code section satisfies build requirements, (e) upon determining that the at least one set of code diagnostics satisfies a diagnostic goal for mainframe stability, attempt to create a deployment package from the code section, (f) upon successfully creating the deployment package, identify a production program running on the mainframe device, (g) compare the production program to the deployment package to identify a set of synchronization errors, (h) resolve the set of synchronization errors, and (i) deploy the deployment package to the mainframe device upon resolving the set of synchronization errors.

In another aspect, a mainframe deployment device is provided for deploying code to a mainframe device in a stable, self-correcting manner. The mainframe deployment device includes a processor and a memory device. The mainframe deployment device is in communication with at least a software management device, a dispatcher device, at least one testing device, and a mainframe device. The processor of the mainframe deployment device is configured to (a) receive a code section from the software management device, wherein the code section includes a status identifier, (b) upon determining that the status identifier is complete, identify a set of valid sub-components from the code section using a dispatcher service associated with the dispatcher device, (c) upon determining that the identified set of valid sub-components are capable of creating a build, identify a set of elements in the code section identified for deployment, (d) upon determining that the set of elements in the code section are deployable, request the at least one testing service to perform at least one set of code diagnostics to determine whether the code section satisfies build requirements, (e) upon determining that the at least one set of code diagnostics satisfies a diagnostic goal for mainframe stability, attempt to create a deployment package from the code section, (f) upon successfully creating the deployment package, identify a production program running on the mainframe device, (g) compare the production program to the deployment package to identify a set of synchronization errors, (h) resolve the set of synchronization errors, and (i) deploy the deployment package to the mainframe device upon resolving the set of synchronization errors.

In yet another aspect, a method is provided for deploying code to a mainframe device in a stable, self-correcting manner. The method is performed by a mainframe deployment device including a processor and a memory. The method includes (a) receiving a code section from a software management device, wherein the code section includes a status identifier, (b) upon determining that the status identifier is complete, identifying a set of valid sub-components from the code section using a dispatcher service associated with a dispatcher device, (c) upon determining that the identified set of valid sub-components are capable of creating a build, identifying a set of elements in the code section identified for deployment, (d) upon determining that the set of elements in the code section are deployable, requesting at least one testing service to perform at least one set of code diagnostics to determine whether the code section satisfies build requirements, (e) upon determining that the at least one set of code diagnostics satisfies a diagnostic goal for mainframe stability, attempting to create a deployment package from the code section, (f) upon successfully creating the deployment package, identifying a production program running on a mainframe device, (g) comparing the production program to the deployment package to identify a set of synchronization errors, (h) resolving the set of synchronization errors, and (i) deploying the deployment package to the mainframe device upon resolving the set of synchronization errors.

In a further aspect, a quality assurance system for maintenance and security of mainframe codebases is provided. The quality assurance system includes a mainframe device including a mainframe processor and a mainframe memory. The mainframe memory includes a mainframe codebase. The quality assurance system also includes a mainframe deployment device further including a processor and a memory device. The mainframe deployment device is in communication with the mainframe device. The processor is configured to import the mainframe codebase from the mainframe device. The mainframe codebase includes at least one code region including at least one code element. The processor is also configured to identify the at least one code region of the mainframe codebase and to initialize a branch repository corresponding to at least one identified code region. The processor is additionally configured to query the imported mainframe codebase to identify, for the code elements, a user identifier and a source region. The user identifier indicates an owner of the respective code element. The source region represents the code region of the respective code element. The processor is also configured to populate the branch repositories with the code elements based on the respective source region. The processor is further configured to apply a code quality scan to the populated branch repositories to identify a code quality issue in the respective code elements. The processor is also configured to submit at least one code element having an identified code quality issue to a user device associated with the respective user identifier to correct the code quality issues.

In yet another aspect, a mainframe deployment device for providing mainframe codebase maintenance and security is provided. The mainframe deployment device includes a processor and a memory device. The mainframe deployment device is in communication with a mainframe device including a mainframe processor and a mainframe memory. The mainframe memory includes a mainframe codebase. The processor is configured to import the mainframe codebase from the mainframe device. The mainframe codebase includes at least one code region including at least one code element. The processor is also configured to identify the at least one code region of the mainframe codebase and to initialize a branch repository corresponding to at least one identified code region. The processor is additionally configured to query the imported mainframe codebase to identify, for the code elements, a user identifier and a source region. The user identifier indicates an owner of the respective code element. The source region represents the code region of the respective code element. The processor is also configured to populate the branch repositories with the code elements based on the respective source region. The processor is further configured to apply a code quality scan to the populated branch repositories to identify a code quality issue in the respective code elements. The processor is also configured to submit at least one code element having an identified code quality issue to a user device associated with the respective user identifier to correct the code quality issues.

In an additional aspect, a method for providing mainframe codebase maintenance and security is provided. The method is performed by a mainframe deployment device including a processor and a memory. The method includes importing the mainframe codebase from a mainframe device. The mainframe codebase includes at least one code region including at least one code element. The method also includes identifying the at least one code region of the mainframe codebase and initializing a branch repository corresponding to at least one identified code region. The method includes querying the imported mainframe codebase to identify, for the code elements, a user identifier and a source region. The user identifier indicates an owner of the respective code element. The source region represents the code region of the respective code element. The method additionally includes populating the branch repositories with the code elements based on the respective source region. The method also includes applying a code quality scan to the populated branch repositories to identify a code quality issue in the respective code elements. The method also includes submitting at least one code element having an identified code quality issue to a user device associated with the respective user identifier to correct the code quality issues.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

DETAILED DESCRIPTION

Figure 1:
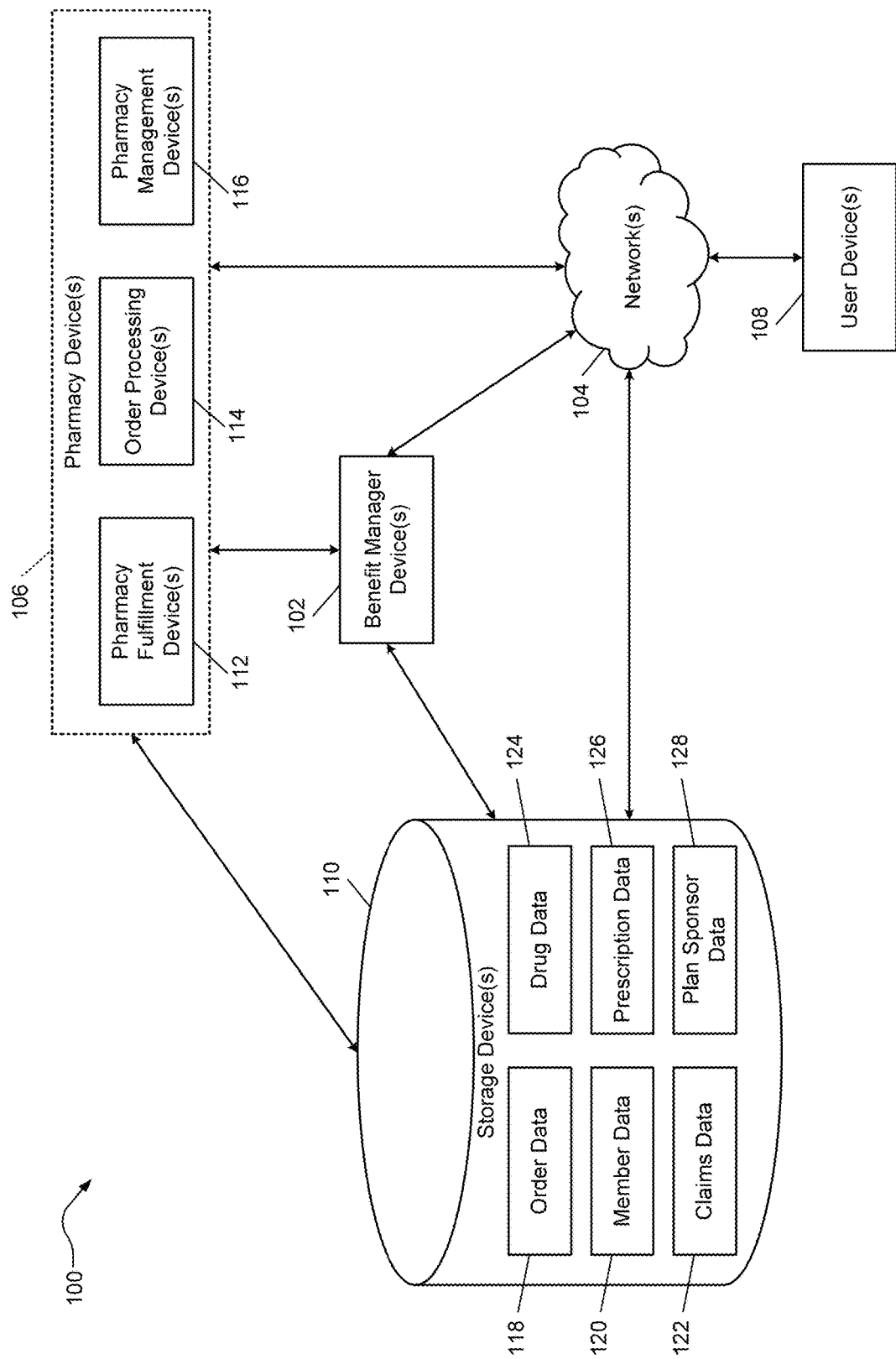
FIG. 1 is a functional block diagram of an example system including a high-volume pharmacy.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

As used herein, the term "mainframe" refers to a central data processing system used in large organizations. Mainframe systems typically are systems used to host mission-critical programs including commercial databases, transaction servers, and crucial applications that may require high-availability or high-security. Mainframe systems are typically capable of working with and processing hundreds of thousands or millions of input/output ("I/O") operations simultaneously. In many instances, mainframe systems employ clustering technologies to provide multiple instances of programs simultaneously. Relevant to this application, mainframe systems typically utilize specialized hardware and operating systems.

As used herein, the term "CICD" or "CI/CD" refers to a combined process of continuous integration ("CI") and continuous deployment (or delivery)("CD"). Continuous integration is the software engineering practice of merging all working copies of developer source code into a shared repository on a repeated basis (e.g., multiple times per day). Continuous deployment (or delivery) is a software engineering practice of producing software using short development cycles, thereby ensuring that software can be reliably released at any time. The purpose of continuous deployment (or delivery) is to build, test, and release software with greater speed and frequency. CICD generally has the goals of (1) reducing the time, cost, and risk of delivering changes to software programs, and (2) allowing software programming teams to be more agile, and responsive to feature and enhancement requests.

As used herein, the term "code coverage" (or "test coverage") refers to a measurement to describe the degree to which source code of a program is executed when a particular test bed (or test suite) is run. Therefore, for example, a program with a high measured code coverage value has more of its source code used during testing, and a program with a low measured code coverage value has less of its source code used during testing. As such, high scores for code coverage correlate to (a) source code that efficiently satisfies the use cases underlying the test bed (or test suite), and (b) source code that that is more completely tested by the test bed (or test suite).

As used herein, the terms "tests", "test suite", or "test bed" refer to a collection of software tests that are run in the course of software development to test whether a software program can demonstrate expected sets of behaviors without failure. Failure of a software program to satisfactorily demonstrate such expected sets of behaviors may be identified as a "bug" or a "testing error". As described herein, once run, test suites and test beds may generate testing results reflecting the degree to which the software program either demonstrated expected behaviors, or failed to demonstrate such expected behaviors. In some examples, testing results may be represented as a numeric score. In other examples, testing results may be represented as a percentage, a ranking, or a qualitative score.

As used herein, the term "dispatcher" or "dispatcher device" refers to systems and programs that assign tasks, work, and activities to systems, programmers, or other entities. As used herein, dispatchers and dispatcher devices make such assignments based on pre-defined project descriptions or "stories".

As used herein, the term "quality assurance" or "QA" refers to methods of preventing mistakes and defects in software development and avoiding problems when delivering software or technical services to production use by customers or other users. Quality assurance or QA refers to tasks conducted to identify, assess, and remediate code quality issues and code security issues as well as other issues in source code.

As used herein, the term "code region" refers to any identifiable division, region, sub-division, or sub-region of mainframe codebases. As described herein, mainframe codebases such as COBOL codebases are structured to use organizational sections, divisions, regions to divide or sub-divide the codebases. For example, a COBOL program is split into four code divisions (or code regions) in the following order: an identification division, an environment division, a data division, and a procedure division. The identification division specifies the name and type of the source element and is where classes and interfaces are specified. The environment division specifies any program features that depend on the system running it. These may include files and character sets. The data division is used to declare variables and parameters. The procedure division contains the program's statements. Each division is sub-divided into sections, which are made up of paragraphs. Generally, a mainframe codebase utilizes defined headers, structures, and other syntactical elements to define each code region. For example, in COBOL, such code regions typically have defined headers for distinguishing divisions, sections, paragraphs, and data divisions.

As used herein, the term "code element" refers to a section of mainframe codebase and specifically to an element or component of the codebase. Mainframe codebases, such as COBOL, are hierarchical in structure and include elements with respective sub-ordinate elements. For example, in COBOL, the hierarchical levels are the following, in descending order (from most general to most specific): (1) program, (2) division, (3) section, (4) paragraph, (5) sentence, and (6) statement. A program is the "highest" hierarchical level in a mainframe codebase and includes a collection of code that is decipherable by a COBOL interpreter.

As used herein, a "division" is a block of code, usually containing one or more sections, that starts where the division name is encountered and ends with the beginning of the next division or with the end of the program text. As used herein, a "section" is a block of code usually containing one or more paragraphs. A section begins with the section name and ends where the next section name is encountered or where the program text ends. Section names are devised by the programmer, or defined by the language. A section name is typically followed by the word "SECTION" and a period (".").

As used herein, a "paragraph" is a block of code made up of one or more sentences. A paragraph begins with the paragraph name and ends with the next paragraph or section name or the end of the program text. A paragraph name is devised by the programmer or defined by the language, and is followed by a period. As used herein, a "sentence" typically includes one or more statements and is terminated by a period.

As used herein, a "statement" includes a mainframe operation (e.g., a COBOL verb) and an operand or operands.

In view of known problems associated with providing stable deployments to mainframes, systems and methods are described herein that can ensure that code is provided and deployed to mainframes in a self-correcting manner.

Further, in view of known problems associated with mainframe codebases security and maintenance, systems and methods are described herein that ensure that mainframe code is maintained, tested, and risks are mitigated.

Specifically, known mainframe codebases have significant drawbacks in terms of maintenance, code quality, and security. Because of the historic approaches taken in developing for mainframes, such mainframe codebases cannot leverage modern software development tools and systems. For example, modern software development and the tools used to support such development depend on fundamental concepts including (a) code branching, (b) code ownership, and (c) code versioning or code dating. In order to test, QA, and maintain code, such concepts are required in order to (a) efficiently direct code issues to the appropriate owner and (b) ensure that QA efforts are directed to the appropriate branch of code.

The implications of these problems are that mainframe codebases are at great risk of being poorly maintained, tested, secured, and are not available to the QA tools of enterprise development teams. Thus, mainframe systems which run such mainframe codebases are at risk of run-time errors, faults, system downtime, and even obsolescence. Because of the significant importance of mainframe systems (which often run business critical software), the ramifications of such problems may extend throughout entire datacenters or computing environments and may, therefore, pose risk of errors or downtime at a system-wide level. The systems and methods disclosed herein provide a technological solution to such technical problems by providing maintenance and security solutions for mainframe codebases. In one example, the systems and methods may be used on common business-oriented language ("COBOL") codebases. In another, the systems and methods may be used on job control language ("JCL") codebases.

The systems and methods disclosed provide a comprehensive mechanism for software deployment from the beginning of a software lifecycle through deployment. By screening software packages through each phase of the lifecycle, the systems ensure that the end-delivered software packages will only be deployed if they can be done so stably, and within tolerable performance parameters for the mainframe environment.

The systems and methods are performed by a mainframe deployment device. In the example embodiment, the device is configured to be in communication with a software management service, a dispatcher service, at least one testing service, at least one messaging service, and a mainframe device. In the example embodiment, the mainframe deployment device includes a processor and a memory device.

The mainframe deployment device is configured to (i) receive a code section, wherein the code section includes a status identifier, (ii) upon determining that the status identifier is complete, process the code section to identify a set of valid sub-components from the code section, (iii) upon determining that the identified set of valid sub-components are capable of creating a build, identify a set of elements in the code section identified for deployment, (iv) upon determining that the set of elements in the code section are deployable, perform at least one set of code diagnostics to determine whether the code section satisfies build requirements, (v) upon determining that the at least one set of code diagnostics satisfies a diagnostic goal for mainframe stability, attempt to create a deployment package from the code section, (vi) upon successfully creating the deployment package, identify a production program running on the mainframe device, (vii) compare the production program to the deployment package to identify a set of synchronization errors, (viii) resolve the set of synchronization errors, and (ix) deploy the deployment package to the mainframe device.

Further, the mainframe deployment system is configured to execute a series of processes that collectively facilitate the stable and reliable deployment of code to the mainframe. In particular, the processes include (a) a dispatcher process, (b) a pre-deployment validation process, (c) a code analysis process, (d) a pre-deployment test process, (e) a code coverage analysis process, (f) an approval process, (g) a build package creation process, (h) a package casting process, (i) a package execution process, and (j) a post-deployment test process.

The mainframe deployment device is configured to receive a code section that includes a status identifier from the software management device. The mainframe deployment device determines whether the status identifier reflects that the code section is identified as complete, and if so, identifies a set of valid sub-components from the code section using the dispatcher service. The dispatcher service initiates the dispatcher process and, in so doing, receives a web hook, parses the web hook, and loads a configuration based on the parsed web hook. The dispatcher service continues the dispatcher process by confirming whether a configuration loaded. If the configuration does not load, the build fails. If the configuration loads, the dispatcher service determines whether the code section has valid sub-components. If the dispatcher service determines that the code section does not have valid sub-components, the dispatcher service updates the software management device to reflect the fact that the code section does not have valid sub-components, and the build is marked as unstable. If the dispatcher service determines that the code section has valid sub-components, the dispatcher service generates job parameters, and attempts to execute the job. If the dispatcher service can locate the job and execute it, the build succeeds through this stage. If the dispatcher service cannot locate the job and execute it, the build fails.

The mainframe deployment device is also configured to identify a set of elements in the code section identified for deployment, upon determining that the identified set of valid sub-components are capable of creating a build. In so doing, the mainframe deployment device performs a pre-deployment validation process. The mainframe deployment device loads a build configuration, updates the software management device to reflect the build configuration loading, and verifies that at least one requested element exists in the source region. More specifically, the mainframe deployment device determines whether one of the elements indicated in the build configuration exists in the source region. If no elements exist, the mainframe deployment device determines that deployment is not possible and the build fails. If the mainframe deployment device determines that at least one requested element exists in the source region, the mainframe deployment device determines whether all elements can be deployed. If all elements can be deployed, the mainframe deployment device proceeds. If some of the elements cannot be deployed, the mainframe deployment device issues a warning (such as a missing elements warning), updates the software management device to reflect the warning, and proceeds.

The mainframe deployment device is also configured to perform a code analysis process. The mainframe deployment device receives proposed source code and analyzes the code for dependencies. In some examples, the mainframe deployment device determines whether it requires parsing information. In some examples parsing information may include data such as "copybooks" that are used to parse COBOL programs. The mainframe deployment device requests such parsing information, if required, and applies it. The mainframe deployment device runs a code quality scan to detect code quality issues including code smells, security vulnerabilities, and code bugs. In some examples, the mainframe deployment device uses an external code review system running code inspection programs to perform the code quality scan. The mainframe deployment device receives code quality results from the code quality scan and, if needed, updates the external code review system with the code quality results. The mainframe deployment device also provides the code quality results to an approver. In some examples, the approver is a programmatic function that determines whether the code quality results satisfy programmatic criteria. In other examples, the approver is a human reviewer. The mainframe deployment device receives a response regarding whether the code quality results meet a minimum code quality threshold. If the threshold is met, the build succeeds and the project continues. If the threshold is not met, the build fails.

The mainframe deployment device is also configured to request that the at least one testing service perform at least one set of code diagnostics to determine whether the code section satisfies build requirements. In some examples, the mainframe deployment device requests that the at least one testing service perform a pre-deployment test process. The testing service obtains a list of proposed tests to be run on the proposed code. The testing service also obtains testing configurations associated with the obtained list of proposed tests. The testing service calls a test manager and requests that the test manager perform each of the tests in the list of proposed tests, pursuant to the test configurations. The testing service waits for the test manager response and records the results for each test. Results for each test may be indicated based on the amount of successful behaviors or unsuccessful behaviors for each test. The testing service determines aggregate testing results and determines whether the aggregate testing goals are met. If all tests completed without errors, bugs, or exceptions, the pre-deployments test process concludes and the process proceeds. If some tests were completed with errors, bugs, or exceptions, but the aggregate testing goals are met, the testing service reports the errors and the process proceeds. If the aggregate testing goals are not met, the build fails.

The mainframe deployment device is also configured to perform a code coverage analysis process after the testing process. The mainframe deployment device determines whether code coverage data is available. Code coverage data may be obtained during the pre-deployment test process by determining the degree to which the source code was executed when the tests of the pre-deployment test process were run. If code coverage data is not available, the mainframe deployment device generates a warning and proceeds. If code coverage data is available, the mainframe deployment device obtains the code coverage data and determines whether a minimum code coverage goal is met by comparing the code coverage data to a minimum threshold for code coverage. If the minimum code coverage goal is met, the mainframe deployment device proceeds. If the minimum code coverage goal is not met, the mainframe deployment device generates a warning, and proceeds.

The mainframe deployment device is also configured to perform an approval process. The mainframe deployment device generates a build approval message to be provided to an approver. The mainframe deployment device determines whether at least one communication service is configured. In some instances, the communication service may be, for example, an instant messaging service for use in project management. In other instances, the communication service may be any other suitable electronic messaging service including, for example, e-mail. If the communication service is configured, the mainframe deployment device generates a request to be sent to the approver through the communications service (including, for example, e-mail or instant messaging). The mainframe deployment device waits for a response from the approver. The mainframe deployment device determines whether the response is an approval. If the response is an approval, the build succeeds through this phase and the mainframe deployment device proceeds. If the response is not an approval or if the response comes after a time-out, the build fails. As such, a build can only proceed if an approver approves of the build within the pre-determined time-out window.

The mainframe deployment device is also configured to perform a build package creation process. The mainframe deployment device generates a package instruction statement. As used herein, a package instruction statement is control information for a code release that may be used to generate a package. The mainframe deployment device may pre-process the package instruction statement prior to attempting to create a package based on it. For example, if the package instruction statement is associated with a particular requirement (e.g., COBOL 6 may require a processor group), the package instruction statement is adjusted to address such a requirement. The mainframe deployment device attempts to create a package based on the package instruction statement. If the mainframe deployment device successfully creates the package, the build succeeds through this stage and the mainframe deployment device proceeds. If the mainframe deployment device fails to create the package, the build fails and the mainframe deployment device sends a failure alert.

The mainframe deployment device is also configured to perform a package casting process. The mainframe deployment device sends a cast request and determines whether the casting succeeded. If the casting succeeded, the mainframe deployment device proceeds and the build continues through this stage. If the casting fails, the mainframe deployment device determines whether the casting resulted in synchronization errors. If the casting failed and there were not synchronization errors, the mainframe deployment device determines that there was a failure, sends a failure alert, and the build fails. If the casting failed and there were synchronization errors, the mainframe deployment device sends an error alert message to an approver and waits for input approving the build over the synchronization failures. If the mainframe deployment device fails to receive a response to the input within a time-out window or if the input received is a rejection of approval, the mainframe deployment device determines that that there was a failure, sends a failure alert, and the build fails. If the mainframe deployment device receives an approval response to the input within the time-out window, the package instruction statement is updated to reflect the approval and the mainframe deployment device sends a cast request. If the casting succeeded, the mainframe deployment device proceeds and the build continues through this stage. If the casting fails, the mainframe deployment device determines that that there was a failure, sends a failure alert, and the build fails.

The mainframe deployment device is also configured to perform a package execution process. The mainframe deployment device determines whether approval is required prior to deployment. If the mainframe deployment device determines that approval is required, the mainframe deployment device sends a request for approval and determines whether approval was received. If approval is not successfully received, the mainframe deployment device determines that authentication failed and re-requests credentials for approval. If the mainframe deployment device determines that approval was received, or that approval was not required, the mainframe deployment device determines whether sweep approval is required. If sweep approval is required, the mainframe deployment device sends a request for sweep approval and determines whether sweep approval was received. After sweep approval is received (or if it is not required), the mainframe deployment device executes the package and determines whether it was successful. If the package execution was not successful, the build fails. If the package execution was successful, the mainframe deployment device determines whether the package execution resulted in exceptions. If the mainframe deployment device determines the package execution did not create exceptions, the mainframe deployment device proceeds. If the mainframe deployment device determines the package execution created exceptions, the mainframe deployment device generates a warning and proceeds.

The mainframe deployment device is also configured to request that the testing service perform a post-deployment test process. The testing service obtains a list of proposed tests to be run on the deployed code. The testing service also obtains testing configurations associated with the obtained list of proposed tests. The testing service calls a test manager and requests that the test manager perform each of the tests in the list of proposed tests, pursuant to the test configurations. The testing service waits for the test manager response and records the results for each test. Results for each test may be indicated based on the amount of successful behaviors or unsuccessful behaviors for each test. The testing service determines aggregate testing results and determines whether the aggregate testing goals are met. If all tests completed without errors, bugs, or exceptions, the post-deployments test process concludes. If some tests were completed with errors, bugs, or exceptions, but the aggregate testing goals are met, the testing service reports the errors and the process proceeds. If the aggregate testing goals are not met, the deployed build is marked as failing.

In another embodiment, the mainframe deployment device and mainframe device are incorporated into a quality assurance system that is used to ensure mainframe codebase maintenance, quality assurance, and security risk mitigation. The quality assurance system provides two primary benefits—enhanced mainframe codebase quality assurance and identification of sensitive information in mainframe codebases.

Regarding mainframe codebase quality assurance, the benefits may be described as follows. Generally, code review occurs late in the software development process. If and when issues are found late in the process, business requirements may drive development teams to ship a product with bugs or errors. Second, it is often difficult or impossible to identify an owner (i.e., a person or team responsible for a particular section of codebase). In some examples, the owner may be the author of the codebase or section of codebase. In other examples, the owner may be a group of authors of the codebase or section of codebase. In additional examples, the owner may be any individual(s) assigned responsibility to the codebase or section of codebase, including when the author is unavailable. This problem is compounded in mainframe codebases because mainframe codebases do not require user-specific check-ins that may allow for identification of users. Third, given the scope and size of codebases (and particularly mainframe codebases), it is difficult or impossible for human developers to truly review codebases or changes to codebases. As a result, code reviews of mainframe codebases often become "rubber stamps" where a codebase is approved for shipment without sufficient analysis or investigation. This is further compounded by inconsistent criteria to review codebases. By necessity, the codebase sections that are changed most often are often the most difficult to maintain or to QA. Fourth, and crucially, the design of mainframe codebases makes it difficult or impossible to address these underlying concerns because (a) it is difficult to identify owners of code sections, (b) version control and management is obscured because it is difficult to identify the most current elements of a particular section of the codebase, and (c) code branching is not natively supported.

The quality assurance system provided address these problems and allows developers to create a code review process that (a) prioritizes review of new code and/or changed code; (b) delegates/assigns and controls ownership of QA and code maintenance; (c) applies consistent rules across sub-projects, projects, and development teams; and (d) allows for code maintenance for the most changed code.

As used herein, mainframe codebases may include "projects" representing codebases for a particular mainframe. A "project" is a discrete part of a mainframe codebase that is aligned with a subsystem or subsystems (e.g., POS-POS) of a mainframe environment and typically provides a discrete function or set of functions. As used herein, a "quality profile" is a set of rules, conditions, or metrics that are used to evaluate a mainframe codebase during testing, QA, and/or maintenance. As used herein, a "code issue" or an "issue" is an indication that a given code element (or another code hierarchical level) has failed to meet a quality profile or a part of a quality profile. As used herein, a "quality gate" is a set of thresholds or rules that may be used to determine whether a code element, codebase, or section of a codebase meets QA or maintenance goals and may be considered for production or promoted in a codebase lifecycle. As used herein, an "application" is a group of one or more projects that may be evaluated together by a quality gate. As used herein, "rules" are used to analyze a codebase (using, e.g., a code quality scan or a code security scan) to identify issues in a code element, a section of a codebase, or a codebase. In general, rules have detailed descriptions including profiles for compliant code (i.e., code that passes each rule) and non-compliant code (i.e., code that fails each rule).

In another example embodiment, a quality assurance system is provided for maintenance and security of mainframe codebases. The quality assurance system includes a mainframe device that includes a mainframe processor and a mainframe memory. The mainframe memory includes a mainframe codebase. As used herein, a "mainframe codebase" may be any body of software code that may run on a mainframe server including, for example, COBOL, JCL, Assembly, or Rexx. The quality assurance system also includes the mainframe deployment device including a processor and a memory device. In the example embodiment, the mainframe deployment device is in communication with the mainframe device via any suitable protocol.

The processor is configured to import the mainframe codebase from the mainframe device, wherein the mainframe codebase includes at least one code region including at least one code element. In one example, the processor imports (or downloads) the mainframe codebase for each subsystem of the mainframe device.

The processor is also configured to identify the at least one code region of the mainframe codebase. The processor may further perform an initialization step whereby the processor checks to see if a branch repository exists for each of the subsystems. As described herein, each branch repository corresponds to a code region from the mainframe codebase. Thus, in operation a branch repository may actively be utilized for code quality maintenance, QA, testing, security, or debugging for a corresponding code region of the mainframe codebase. If the corresponding branch repository does not exist, the processor may obtain an empty list of branches for initialization. If the corresponding branch repository exists, the processor downloads corresponding code elements and updates the corresponding branches if and when updates have been determined. Thus, the processor is additionally configured to initialize a branch repository corresponding to at least one identified code region.

The processor is also configured to query the imported mainframe codebase to identify, for the code elements, a user identifier indicating an owner of the respective code element and a source region representing the code region of the respective code element. Specifically, the processor is configured to parse or otherwise query the code elements to identify user identifiers from the code elements based, for example, on code comments, code records, or structured tables linking code regions to user identifiers. The processor is configured to parse or otherwise identify the code region based on the syntactical information of the mainframe codebase.

In one example, the processor is also configured to generate, for each of the respective branch repositories, a list of element details including a code element identifier distinctly identifying the respective code element, the user identifier for the respective code element, and the source region for the respective code element. In such examples, the list of element details may be used by the processor to facilitate the code quality scans and code security scans, and to assign resulting code security issues and code quality issues to the appropriate user(s), as described below. Specifically, the processor is configured to query the appropriate system (e.g., Endevor) for a list of all mainframe codebase elements (e.g., COBOL elements) for a particular code region (or associated branch repository) and initialize an associated list of element details (or download list). In one example, the list includes a listing for each code element, each user (or user identifier), and a timestamp (for last update). The list of element details thus reflects at least one record for each code element and, in many cases, may provide a functional "change log" or "version control record" indicating the changes to code elements over time, by user, and indicating the time of such changes.

The processor may iteratively query through each code region and identify additional code elements as the mainframe codebase is updated. After the processor identifies each new code element, the processor is configured to add the newly identified code elements to the respective branch repository. In some examples, the processor determines whether the newly identified code element(s) have timestamp(s) that are more recent than the most recent timestamp in the branch repository for the corresponding code element(s) and adds only the newly identified list entries having a more recent timestamp than the corresponding code elements of the branch repository. In such an example, the quality assurance system (and the processor) effectively reduce the complexity of code review and analysis by including only the most recent updates of the code elements.

(Thus, in such examples, intermediate code element entries may be "skipped over" for efficiency.)

In at least some examples, the processor is configured to query the imported mainframe codebase to identify a timestamp indicating a creation time of the respective code element. In such examples, the processor is configured to generate, for the respective branch repositories, the list of element details including the timestamp of the respective code element. The processor may also be configured to sort the list of element details based, at least partially, on the respective identified timestamps. In some such examples, the processor may further be configured to submit at least one code element having an identified code quality issue to a user based at least partially on the respective identified timestamp. In other words, the processor may identify only the instances of a code element having code quality issues with the most recent timestamp to be submitted, thereby ensuring that revisions are made only to appropriate (i.e., current) code element versions.

In some examples, the processor sorts the list of element details (or download list) by the user last responsible for updating that code element. In other examples, the processor sorts the list of element details by timestamp. In such examples, the processor may be configured to generate a map of elements by user identifier (last responsible for updating the code element). The processor may use such a map of code elements to obtain all code elements for a particular user and assign or delegate those code elements to a particular user. In at least some examples, the processor also receives updates to code elements from users (assigned, in some examples, based on the map) and uses the updates to update the mainframe codebase.

The processor is also configured to populate the branch repositories with the code elements based on the respective source region. In other words, each corresponding branch repository associated with a mainframe code region is populated to have code elements from that respective mainframe code region. In at least some examples, each corresponding branch repository includes code elements from the most recent updates (based on timestamps) of the code region. In other examples, each branch repository may be completely populated.

The processor is further configured to apply a code quality scan to the populated branch repositories to identify a code quality issue in the respective code elements. In an example embodiment, the identified code quality issues include at least one of code smells, security vulnerabilities, code bugs, and sensitive information. In at least some examples, the processor is also configured to perform a code security scan. Specifically, the processor may be configured to apply a code security scan to the populated branch repositories to identify a security issue in the respective code elements. In some such examples, the processor may also resolve the identified security issue in the respective code element by altering the respecting code element. Such alteration may occur by deleting, obscuring, distorting, or otherwise rendering unavailable the sensitive information or other information represented in the security issue.

In the example embodiment, there are at least four types of rules applied by a code quality scan (or an equivalent service): (a) a code smell; (b) a code bug; (c) a code vulnerability; and (d) a code hot spot. A code smell may be described as a poor software development practice that may pose maintenance issues. Code smells may be identified based on a pattern, format, logical approach, or a failure to conform to a pattern, format, or logical approach. In many examples, code smells therefore are associated with code smell patterns that positively define patterns for code smells or negatively define patterns that do not present code smells. A bug may be defined as a poor coding practice or defect that may lead to code reliability or performance issues. Like code smells, a code bug may be identified based on a pattern, format, logical approach, or a failure to conform to a pattern, format, or logical approach. In many examples, code bugs therefore are associated with code bugs patterns that positively define patterns for code bugs or negatively define patterns that do not present code bugs. A vulnerability may be defined as a poor coding practice that can result in a security issue because the code may allow an application to be improperly exploitable by third-parties. In many examples, vulnerabilities are identified based on inspection of code elements or codebases to determine whether a third-party device may be able to improperly access an application or data associated with the codebase. A security hot spot may be defined as code elements, sections of codebase, or codebase that pose security concerns by exposing sensitive information or allowing intrusion. The code quality scan may also be substantially integrated with the code security scan so that each can provide overlapping services. Thus, the code quality scan may also identify the presence of sensitive information.

The code quality scan and code security scan are also configured to identify a severity associated with the any code quality issues (e.g., smells, bugs, vulnerabilities, and security hotspots) or code security issues (e.g., presence of sensitive information including access tokens, secrets, passwords, keys, login credentials, Java KeyStore files, and credentialing certificates). In one example, the severity of the code quality scan may be indicated by the following levels: (a) blocker, (b) critical, (c) major, and (d) minor. A blocker code issue may be described as a code quality defect that is highly likely (i.e., exceeding a minimum confidence interval for high likelihood) to cause significant adverse impact when the codebase is in production. A critical code issue may be described as a code quality defect that is likely (i.e., exceeding a minimum confidence interval for a medium likelihood) to cause significant adverse impact when the codebase is in production. A major code issue is a code quality defect that is highly likely (i.e., exceeding a minimum confidence interval for high likelihood) to cause minor adverse impact when the codebase is in production. A minor code issue is a code quality defect that is likely (i.e., exceeding a minimum confidence interval for a medium likelihood) to cause a minor adverse impact when the codebase is in production.

Likewise, the code security scan may be configured to indicate the type and severity of a code security issue. The type of code security issues may indicate one or more of the following types: presence of sensitive information including access tokens, secrets, passwords, keys, login credentials, Java KeyStore files, and credentialing certificates. In some examples, the code security scan searches for true positive references using suitable regular expressions. For example, the code security scan may search for passwords, user identifiers, and credentials using a regular expression on codebase that is commented out with patterns including, for example, "password", "pwd", "credential", "secret", "key", or plurals thereof. In another example, the code security scan may search for statements such as "logon", "login", "login statement", or "auth" with two parameters that may suggest the presence of a user name and a password. The code security scan may therefore search for network credentials including LAN credentials, strings with user credentials, paired login expressions (e.g., pairs of usernames and parameters with corresponding labels such as "password" and "username" or "my_user" and "my_pass" or "pass" and "user" or "pwd" and "name"). In other examples, the code security scan may search using regular expressions specific to particular network security protocols. As such, the code security scan may function in similar manners for codebases including code for COBOL, JavaScript, Visual Basic, ASP, C, C#, batch code, CMD, Java, manifest files, property files, control cards or punch cards, and log files. For example, the code security scan may scan for passwords and/or secrets in Java code by searching files with extensions including *.java, *.sh, *.ksh, *.jsp, .py, *.asp, *.cs, *.properties, and *.yml and identify credentials with regular expressions including "password". When a regular expression matches, the code security scan is configured to capture associated text proximate to the matched pattern as possible sensitive information. In some examples, the code security scan may also score any matches for severity of a security risk by identifying a likelihood that the sensitive information is: (a) low risk, (b) medium risk, and (c) high risk. The severity may be determined based on the location of the source codebase with potentially sensitive information, wherein the code security scan is configured to identify particular applications, projects, code regions, or other code elements may be evaluated based on significance or exposure. The severity may also be determined based on a predicted likelihood of sensitive information based, for example, on a quality of match to a defined pattern.

In other examples, the code quality scan may be configured to provide statistics on code quality including (a) total numbers of code smells, (b) total numbers of code bugs, (c) total numbers of vulnerabilities, (d) total numbers of security hotspots, (e) estimated technical debt indicated the estimated effort to fix the code quality issues, (f) a maintainability rating for the codebase or particular code elements, and (g) a reliability rating for the codebase or particular code elements. In one example, the maintainability rating is a rating of the estimated remediation costs for resolving the code quality issue(s) as compared to the estimated cost of the development of the application. As such the maintainability rating may identify projects or applications that cost improperly high amounts to maintain. In one example, a high rating is at or below 5% (indicating the cost of maintenance is at or below 5% of the total development cost) and a low rating is above 50% (indicating that the cost of maintenance is above 50% of the total development cost). Reliability ratings may be determined by counting the total number of code quality issues and identifying the total number of, for example, blocker bugs. In one example, one or more blocker bugs result in a low reliability rating.

The processor is also configured to submit at least one code element having an identified code quality issue to a user device associated with the respective user identifier to correct the code quality issues. As described above, the processor may use the map, the list, or a query of the branch repository to identify a user or user identifier associated with each code element having a code quality issue (or a code security issue). The processor may assign and route the code element(s) along with necessary information regarding the code quality issue or code security issue including (a) classifications of quality or security issue type; (b) severity information; and (c) instructions on how to remediate the quality or security issue based, for example, on patterns of code smells, code bugs, vulnerabilities, hotspots, or sensitive information.

The processor may also be configured to receive updates from each assigned user and thereby update the branch repository with a corrected or revised code element. The processor may also allow the management and approval of each correction by a user. In some examples, the processor may also interact with the mainframe codebase by uploading such corrections or revisions.

Generally, the systems and methods described herein are configured to perform at least the following steps: (a) receive a code section from the software management device, wherein the code section includes a status identifier, (b) upon determining that the status identifier is complete, identify a set of valid sub-components from the code section using a dispatcher service associated with the dispatcher device, (c) upon determining that the identified set of valid sub-components are capable of creating a build, identify a set of elements in the code section identified for deployment, (d) upon determining that the set of elements in the code section are deployable, request the at least one testing service to perform at least one set of code diagnostics to determine whether the code section satisfies build requirements, (e) upon determining that the at least one set of code diagnostics satisfies a diagnostic goal for mainframe stability, attempt to create a deployment package from the code section, (f) upon successfully creating the deployment package, identify a production program running on the mainframe device, (g) compare the production program to the deployment package to identify a set of synchronization errors, (h) resolve the set of synchronization errors, (i) deploy the deployment package to the mainframe device upon resolving the set of synchronization errors, (j) identify discrepancies between the deployment package and the production program, (k) upon determining that the discrepancies do not cause a failure, automatically resolve the set of synchronization errors and deploy the deployment package to the mainframe device, (l) identify discrepancies between the deployment package and the production program, (m) transmit a message to a system messaging device to request a synchronization resolution, (n) upon receipt of the synchronization resolution indicating that the discrepancies are resolvable, resolve the set of synchronization errors based on the synchronization resolution, (o) deploy the deployment package to the mainframe device, (p) perform a first code analysis of the code section to identify a code quality associated with the code section, (q) identify a predefined threshold for code quality, (r) upon determining that the code section exceeds the predefined threshold, deploy the deployment package to the mainframe device, (s) perform a first code coverage analysis of the code section to identify a code coverage score, (t) identify a predefined threshold for code coverage, (u) upon determining that the code section exceeds the predefined threshold, deploy the deployment package to the mainframe device, (v) transmit a message to a system messaging device to request an approval for deployment of the code section, (w) upon receiving the approval for deployment, deploy the deployment package to the mainframe, (x) upon deployment of the deployment package, request the at least one testing service to perform a set of post-deployment testing to obtain a post-deployment testing score, (y) identify a predefined threshold for the post-deployment testing score, and (z) upon determining that the post-deployment testing score exceeds the predefined threshold, identifying the deployment as stable.

In another example, the mainframe deployment device may be configured to maintain and secure mainframe codebases by performing at least the following steps: import the mainframe codebase from the mainframe device, wherein the mainframe codebase includes at least one code region including at least one code element; identify the at least one code region of the mainframe codebase; initialize a branch repository corresponding to at least one identified code region; query the imported mainframe codebase to identify, for the code elements, a user identifier indicating an owner of the respective code element and a source region representing the code region of the respective code element; populate the branch repositories with the code elements based on the respective source region; apply a code quality scan to the populated branch repositories to identify a code quality issue in the respective code elements; submit at least one code element having an identified code quality issue to a user device associated with the respective user identifier to correct the code quality issues; generate, for the respective branch repositories, a list of element details including a code element identifier distinctly identifying the respective code element, the user identifier for the respective code element, and the source region for the respective code element; query the imported mainframe codebase to identify a timestamp indicating a creation time of the respective code element; generate, for the respective branch repositories, the list of element details including the timestamp of the respective code element; sort the list of element details based, at least partially, on the respective identified timestamps; submit the at least one code element having an identified code quality issue based at least partially on the respective identified timestamp; apply a code quality scan to the populated branch repositories to identify the code quality issues in the respective code elements, wherein the identified code quality issues include at least one of code smells, security vulnerabilities, code bugs, and sensitive information; apply a code security scan to the populated branch repositories to identify a security issue in the respective code elements; and resolve the identified security issue in the respective code element by altering the respecting code element.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
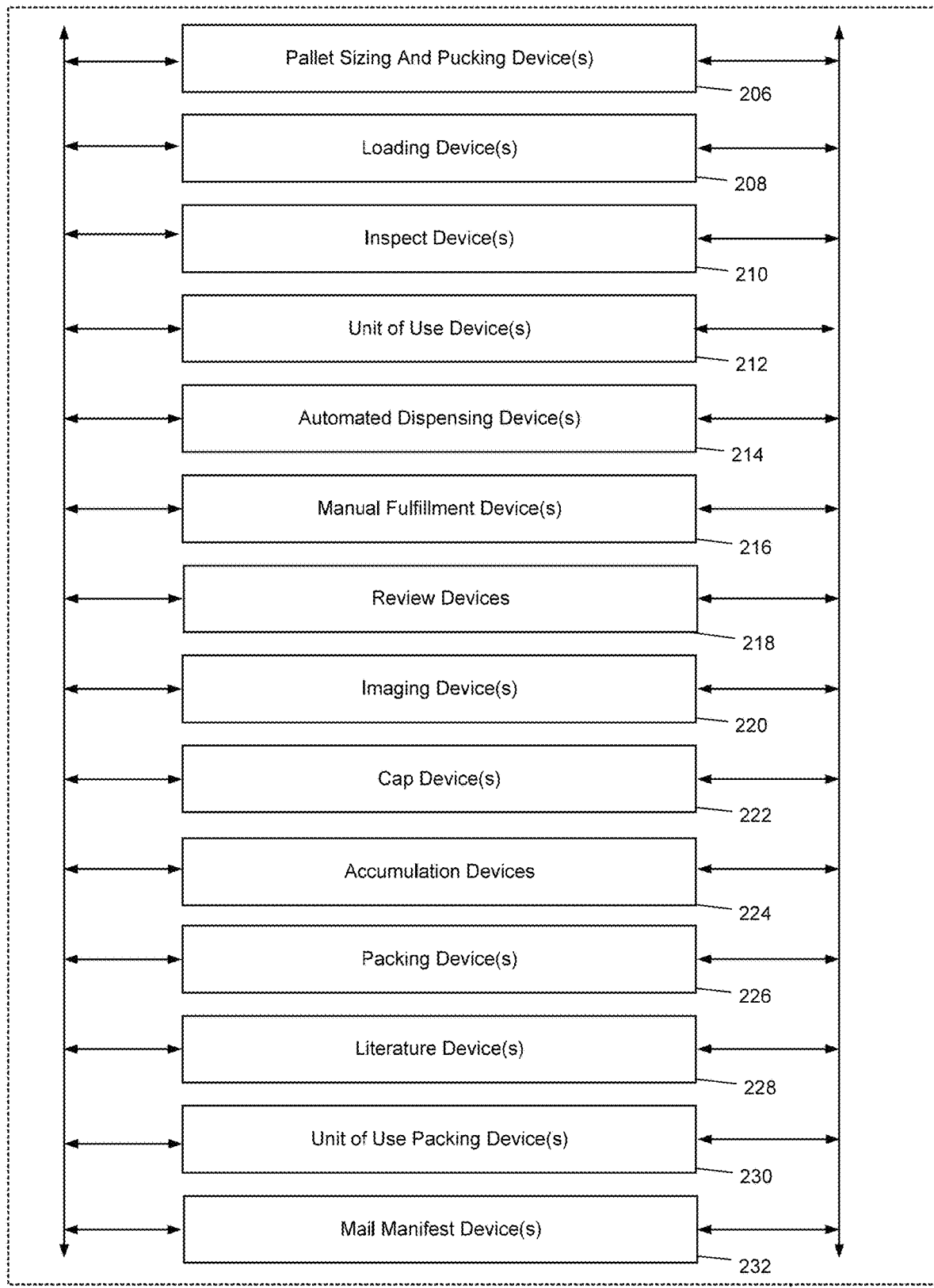
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device (s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck.

In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
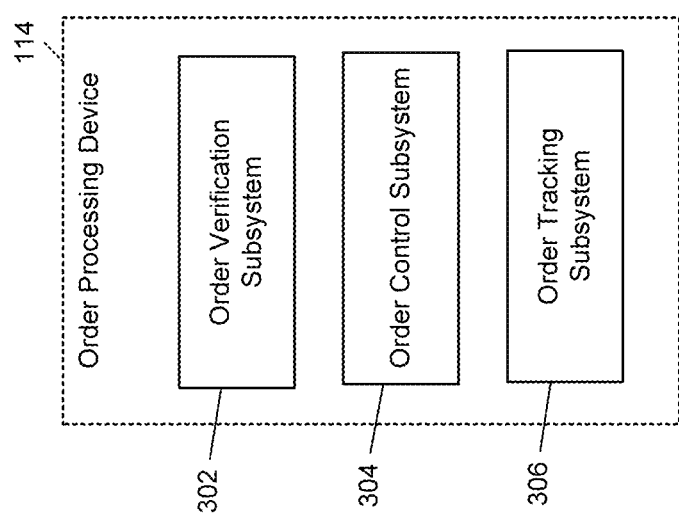
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may include order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Figure 4:
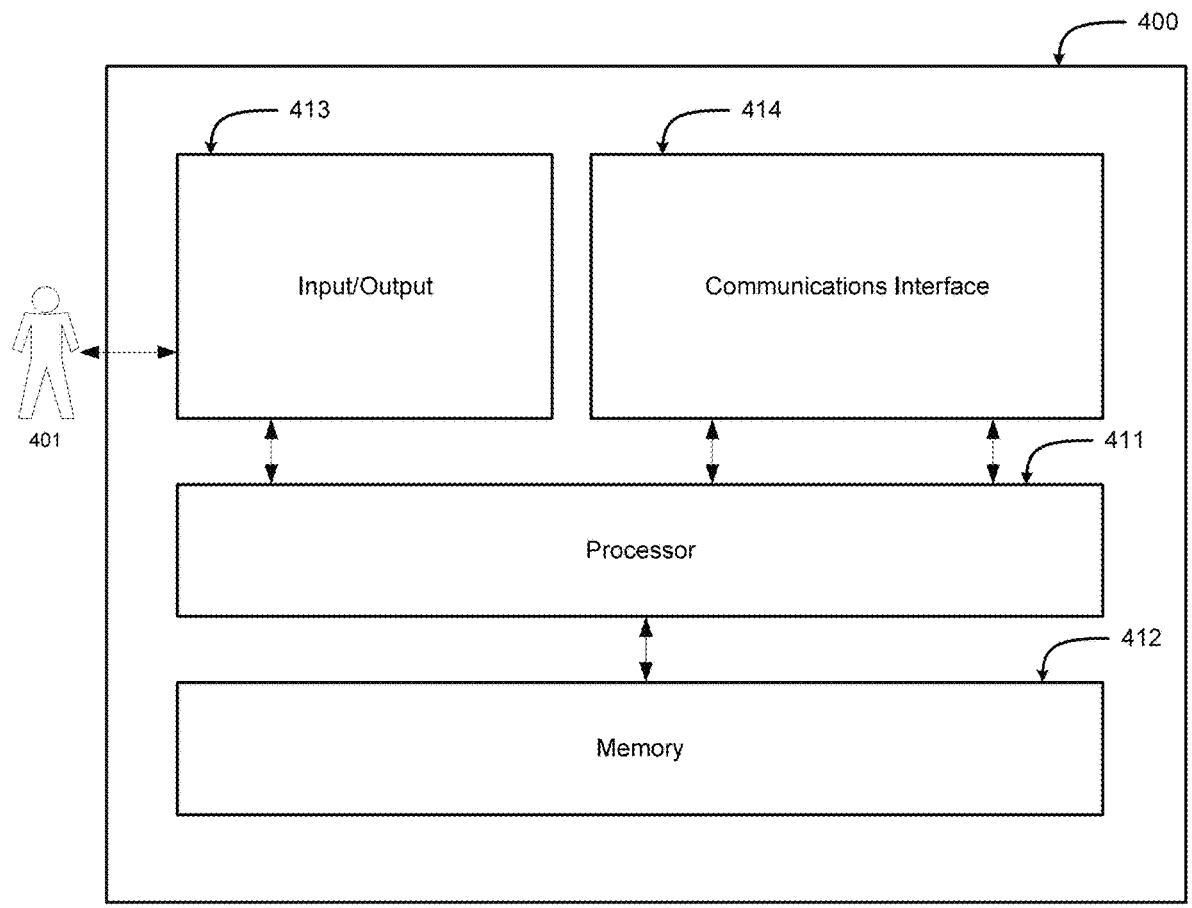
FIG. 4 is a functional block diagram of an example computing device that may be used in the environments described herein.

FIG. 4 is a functional block diagram of an example computing device 400 that may be used in the environments described herein. Specifically, computing device 400 illustrates an exemplary configuration of a computing device. Computing device 400 illustrates an exemplary configuration of a computing device operated by a user 401 in accordance with one embodiment of the present invention. Computing device 400 may include, but is not limited to, a software management device, a dispatcher device, a testing device, a mainframe device, a code analysis device, a mainframe deployment device, and any other system described herein. Computing device 400 may also include pharmacy devices 106 including pharmacy fulfillment devices 112, order processing devices 114, and pharmacy management devices 116, storage devices 110, benefit manager devices 102, and user devices 108 (all shown in FIG. 1), mobile computing devices, stationary computing devices, computing peripheral devices, smart phones, wearable computing devices, medical computing devices, and vehicular computing devices. Alternatively, computing device 400 may be any computing device capable of performing the mainframe deployment methods described herein. In some variations, the characteristics of the described components may be more or less advanced, primitive, or non-functional.

In the exemplary embodiment, computing device 400 includes a processor 411 for executing instructions. In some embodiments, executable instructions are stored in a memory area 412. Processor 411 may include one or more processing units, for example, a multi-core configuration. Memory area 412 is any device allowing information such as executable instructions and/or written works to be stored and retrieved. Memory area 412 may include one or more computer readable media.

Computing device 400 also includes at least one input/output component 413 for receiving information from and providing information to user 401. In some examples, input/output component 413 may be of limited functionality or non-functional as in the case of some wearable computing devices. In other examples, input/output component 413 is any component capable of conveying information to or receiving information from user 401. In some embodiments, input/output component 413 includes an output adapter such as a video adapter and/or an audio adapter. Input/output component 413 may alternatively include an output device such as a display device, a liquid crystal display (LCD), organic light emitting diode (OLED) display, or "electronic ink" display, or an audio output device, a speaker or headphones. Input/output component 413 may also include any devices, modules, or structures for receiving input from user 401. Input/output component 413 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 413. Input/output component 413 may further include multiple sub-components for carrying out input and output functions.

Computing device 400 may also include a communications interface 414, which may be communicatively coupleable to a remote device such as a remote computing device, a remote server, or any other suitable system. Communication interface 414 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX). Communications interface 414 is configured to allow computing device 400 to interface with any other computing device or network using an appropriate wireless or wired communications protocol such as, without limitation, BLUETOOTH®, Ethernet, or IEE 802.11. Communications interface 414 allows computing device 400 to communicate with any other computing devices with which it is in communication or connection.

Figure 5:
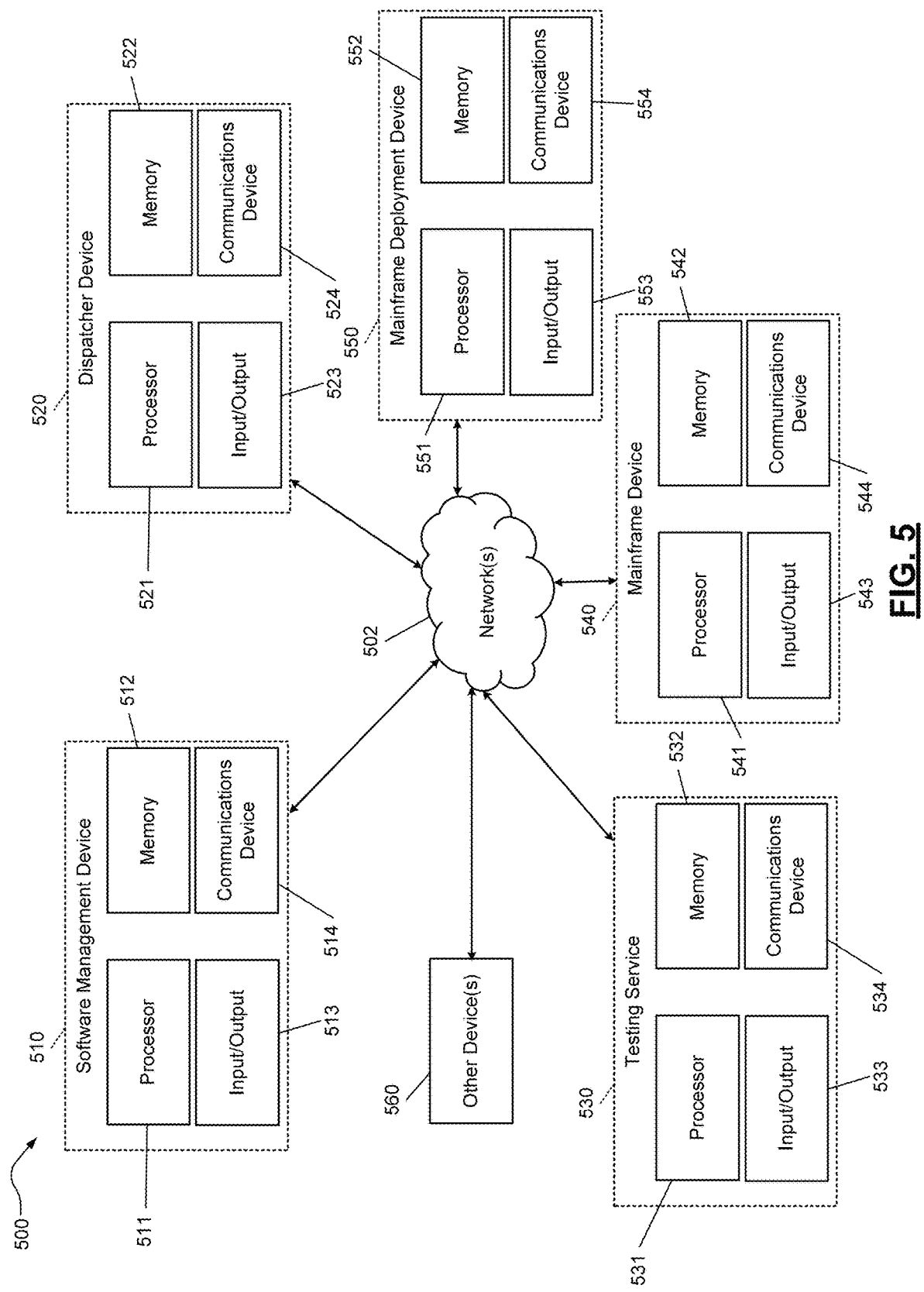
FIG. 5 is a functional block diagram of a mainframe deployment system including multiple computing devices shown in FIG. 4.

FIG. 5 is a functional block diagram of a mainframe deployment system 500 including multiple computing devices 510, 520, 530, 540, 550, and 560 similar to the computing device 400 shown in FIG. 4. Software management device 510 is capable of providing software development management tools and capabilities to facilitate the processes described herein including, for example, maintaining and providing code sections that are evaluated and deployed according to the methods described herein. Software management device 510 includes a processor 511, a memory 512, an input/output 513, and a communications device 514. Dispatcher device 520 is configured to perform the dispatcher processes described herein, and to coordinate the assignation of tasks, work, and activities to systems, programmers, or other entities. Dispatcher device 520 includes a processor 521, a memory 522, an input/output 523, and a communications device 524. Testing service 530 is configured to perform at least the pre-deployment test processes and the post-deployment test processes described herein. Testing service includes a processor 531, a memory 532, an input/output 533, and a communications device 534. Mainframe device 540 is configured to provide the applications and services that are the subject of this application, and it is the aim of this invention to use the mainframe deployment system 500 to provide stable, reliable deployments to mainframe device 540. Mainframe device 540 includes a processor 541, a memory 542, an input/output 543, and a communications device 544. Mainframe deployment device 550 is configured to facilitate or execute many of the processes described herein, and to coordinate the principal method of providing stable software deployments to mainframe device 540. Mainframe deployment device 550 includes a processor 551, a memory 552, an input/output 553, and a communications device 554. Other devices 560 may be designed in a manner similar to computing device 400 and similarly include processors, memories, input/outputs, and communication devices. Computing devices 510, 520, 530, 540, 550, and 560 are in networked communication via network 502.

Figure 6:
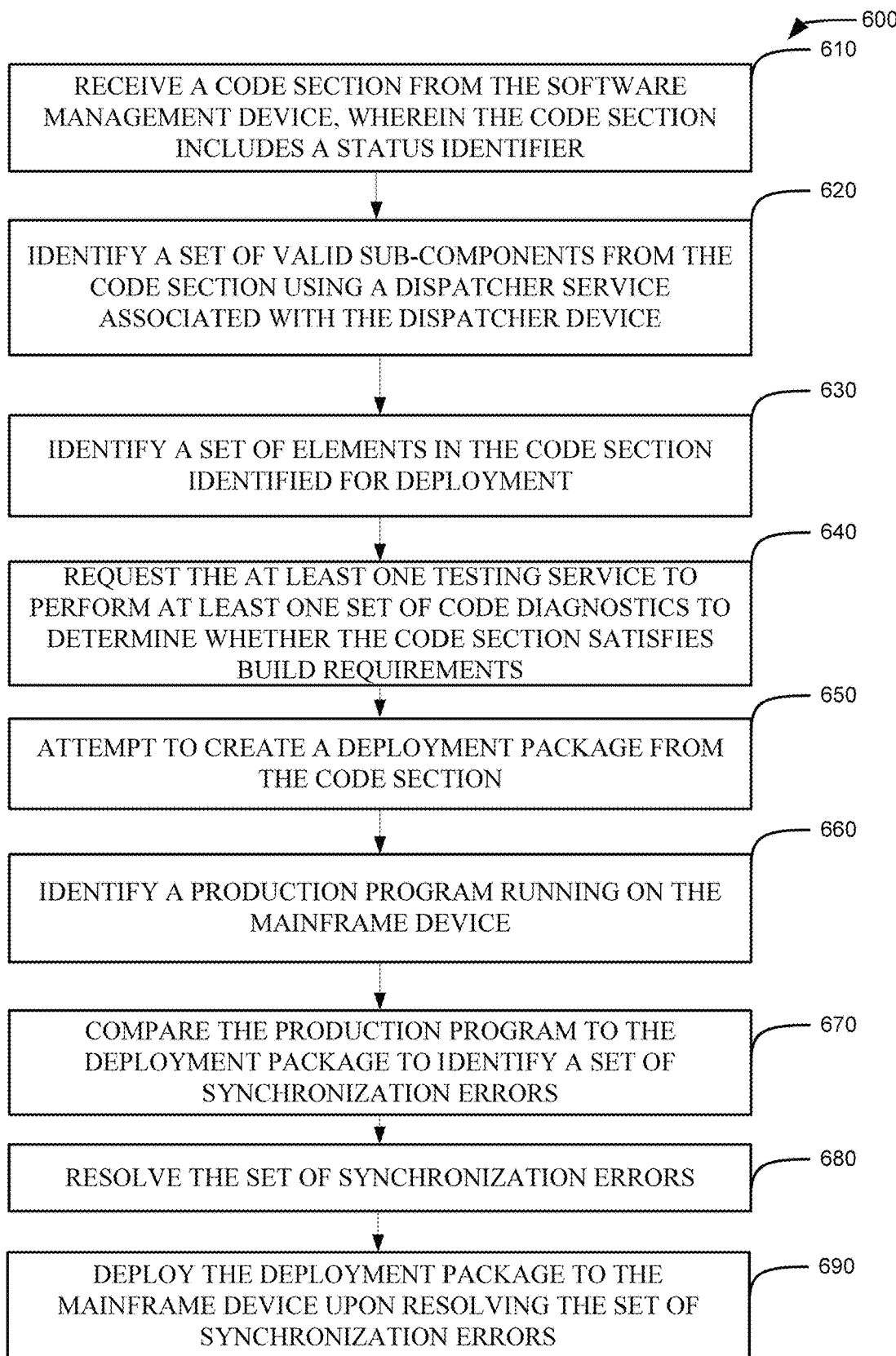
FIG. 6 is a flow diagram representing a method for providing stable software deployments to a mainframe environment performed by the mainframe deployment device of the mainframe deployment system shown in FIG. 5.

FIG. 6 is a flow diagram representing a method 600 for providing stable software deployments to a mainframe environment performed by the mainframe deployment device 550 of the mainframe deployment system 500 shown in FIG. 5. The mainframe deployment device 550 is configured to receive 610 a code section from the software management device, wherein the code section includes a status identifier. Upon determining that the status identifier is complete, the mainframe deployment device 550 is configured to identify 620 a set of valid sub-components from the code section using a dispatcher service associated with the dispatcher device. Upon determining that the identified set of valid sub-components are capable of creating a build, the mainframe deployment device 550 is configured to identify 630 a set of elements in the code section identified for deployment. As used herein, the identified set of valid sub-components is "capable of creating a build" when those sub-components are sufficient to allow for the creation of a build to be deployed on the mainframe device in a stable manner. Where a set of sub-components cannot successfully be used to create such a build, that identified set of sub-components is not "capable of creating a build." Sets of sub-components that are capable of creating a build may vary substantially from one another, and there may be examples in which one set of sub-components that is capable of creating a build may include some elements that are not necessary to qualify as "capable of creating a build", and other examples in which all of the set of sub-components are necessary for that set to qualify as "capable of creating a build."

Upon determining that the set of elements in the code section are deployable, the mainframe deployment device 550 is configured to request 640 the at least one testing service to perform at least one set of code diagnostics to determine whether the code section satisfies build requirements. Upon determining that the at least one set of code diagnostics satisfies a diagnostic goal for mainframe stability, the mainframe deployment device 550 is configured to attempt 650 to create a deployment package from the code section. Upon successfully creating the deployment package, the mainframe deployment device 550 is configured to identify 660 a production program running on the mainframe device. The mainframe deployment device 550 is also configured to compare 670 the production program to the deployment package to identify a set of synchronization errors. The mainframe deployment device 550 is further configured to resolve 680 the set of synchronization errors. The mainframe deployment device 550 is also configured to deploy 690 the deployment package to the mainframe device upon resolving the set of synchronization errors.

Figure 7:
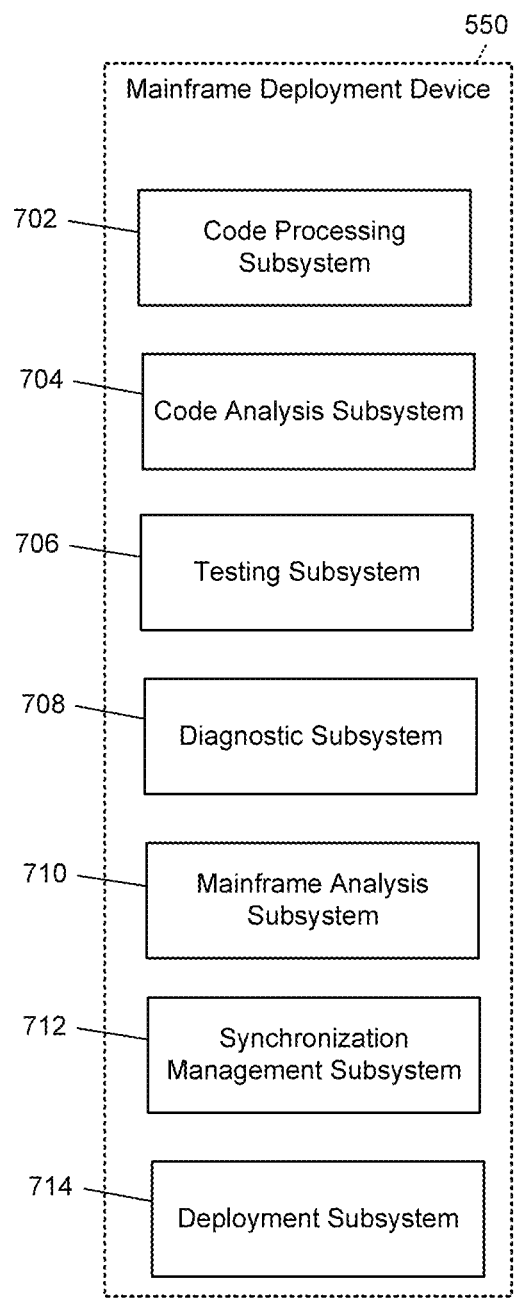
FIG. 7 is a diagram of elements of one or more example computing devices that may be used in the system shown in FIGS. 1-5.

FIG. 7 is a diagram of elements of one or more example computing devices that may be used in the system shown in FIGS. 1-5. As described herein, the elements 702, 704, 706, 708, 710, 712, and 714 are configured to perform the processes and methods described herein. Code processing subsystem 702 is configured to process the code and code sections, and to facilitate processing, receipt, and transmission of such source code. Code analysis subsystem 704 is configured to provide and enable code quality analysis processes and code coverage processes described herein. Testing subsystem 706 is configured to provide and enable the pre-deployment and post-deployment test processes described herein. Diagnostic subsystem 708 is configured to provide and enable the diagnostic processes described herein. Mainframe analysis subsystem 710 is configured to monitor the state of mainframe device 540, and to manage mainframe deployment information to facilitate the methods described. Synchronization management subsystem 712 is configured to manage the error synchronization process prior to code deployment. Deployment subsystem 714 is configured to enable and support all aspects of code deployment to mainframe device 540 including, for example, authorization processes, build package creation processes, package casting processes, and package execution processes.

Figure 8:
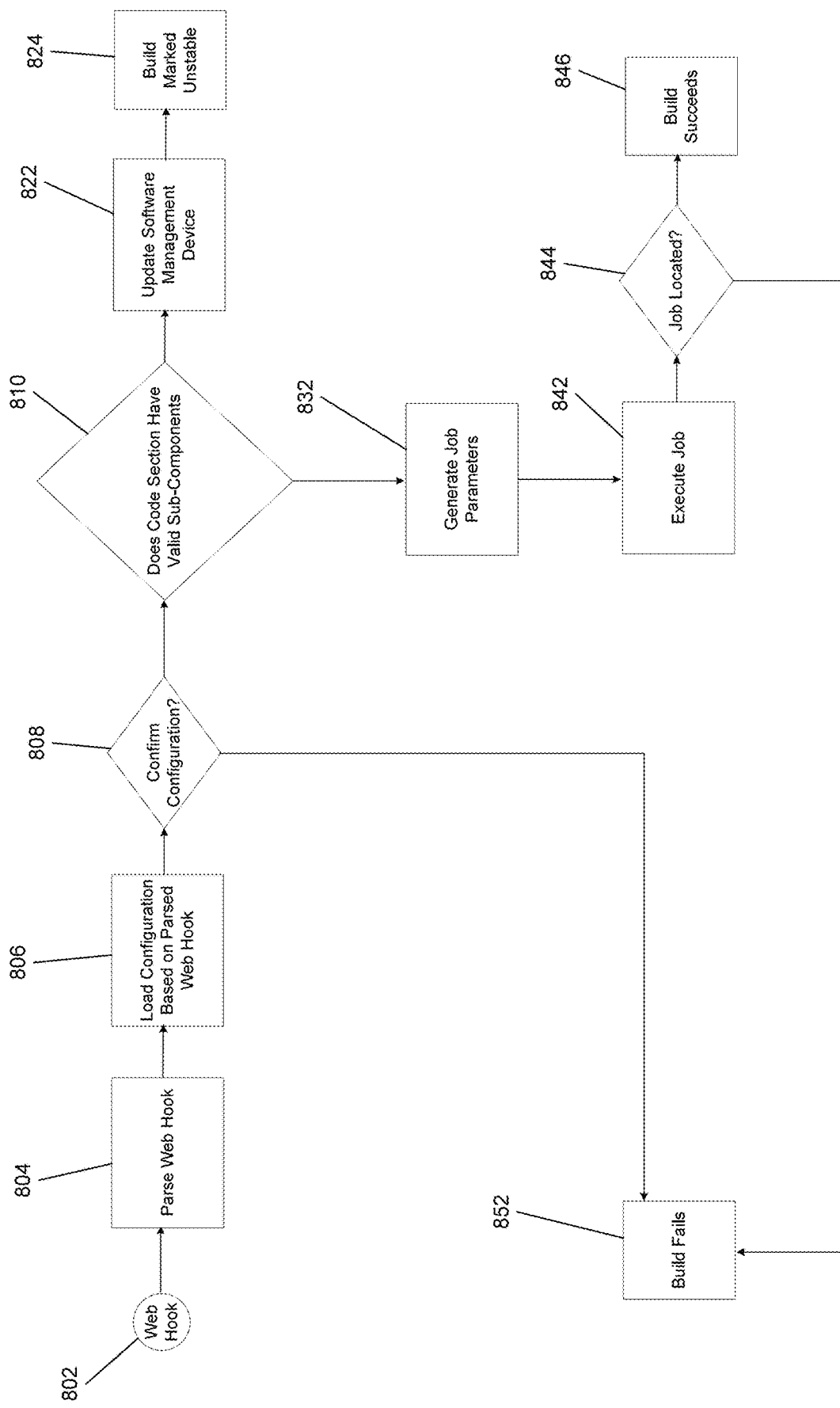
FIG. 8 is a flow diagram representing a dispatcher process performed by the mainframe deployment system of FIG. 5.

FIG. 8 is a flow diagram representing a dispatcher process performed by the mainframe deployment system 500 of FIG. 5. The mainframe deployment device 550 is configured to receive 610 a code section that includes a status identifier from the software management device. The mainframe deployment device 550 determines whether the status identifier reflects that the code section is identified as complete, and if so, identifies 620 a set of valid sub-components from the code section using dispatcher service 520. Dispatcher service 520 initiates the dispatcher process and, in so doing, receives a web hook 802, parses the web hook 804, and loads 806 a configuration based on the parsed web hook. The dispatcher service 520 continues the dispatcher process by confirming 808 whether a configuration loaded. If the configuration does not load, the build fails 852. If the configuration loads, the dispatcher service 520 determines 810 whether the code section has valid sub-components. If the dispatcher service 520 determines that the code section does not have valid sub-components, the dispatcher service 520 updates 822 the software management device to reflect the fact that the code section does not have valid sub-components, and the build is marked 824 as unstable. If the dispatcher service 520 determines that the code section has valid sub-components, the dispatcher service 520 generates 832 job parameters, and attempts to execute 842 the job. If the dispatcher service 520 can locate 844 the job and execute it, the build succeeds 846 through this stage. If the dispatcher service 520 cannot locate the job and execute it, the build fails 852.

Figure 9:
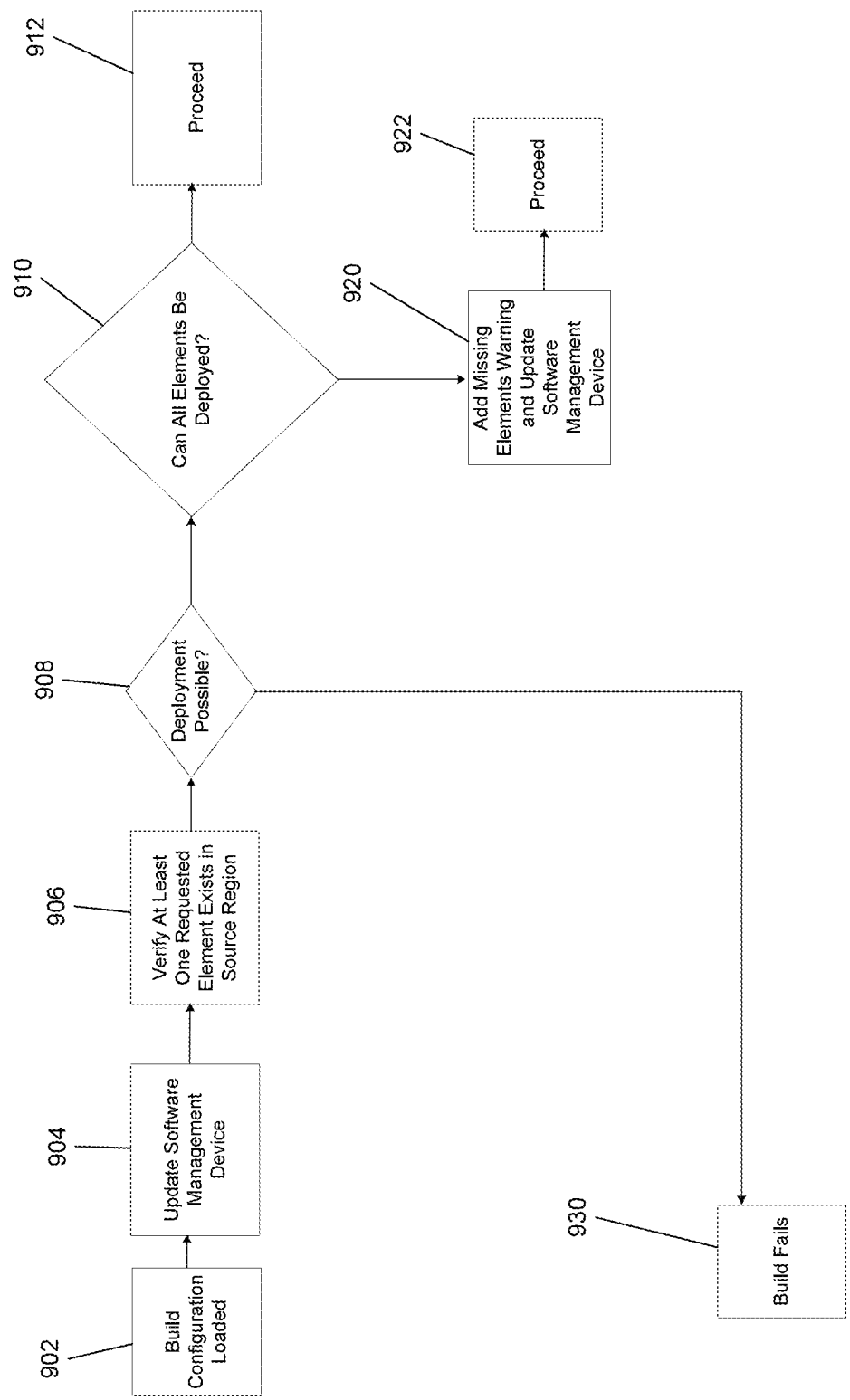
FIG. 9 is a flow diagram representing a pre-deployment validation process performed by the mainframe deployment system of FIG. 5.

FIG. 9 is a flow diagram representing a pre-deployment validation process performed by the mainframe deployment system 500 of FIG. 5. The mainframe deployment device 550 is also configured to identify 630 a set of elements in the code section identified for deployment, upon determining that the identified set of valid sub-components are capable of creating a build. In so doing, the mainframe deployment device performs a pre-deployment validation process. The mainframe deployment device 550 loads 902 a build configuration, updates 904 the software management device to reflect the build configuration loading, and verifies 906 that at least one requested element exists in the source region. More specifically, the mainframe deployment device 550 determines 908 whether one of the elements indicated in the build configuration exists in the source region. If no elements exist, the mainframe deployment device 550 determines 908 that deployment is not possible and the build fails 930. If the mainframe deployment device 550 determines 908 that the deployment is possible, the mainframe deployment device 550 determines 910 whether all elements can be deployed. If all elements can be deployed, the mainframe deployment device 550 proceeds 912. If some of the elements cannot be deployed, the mainframe deployment device 550 issues 920 a warning (such as a missing elements warning), updates the software management device to reflect the warning, and proceeds 922.

Figure 10:
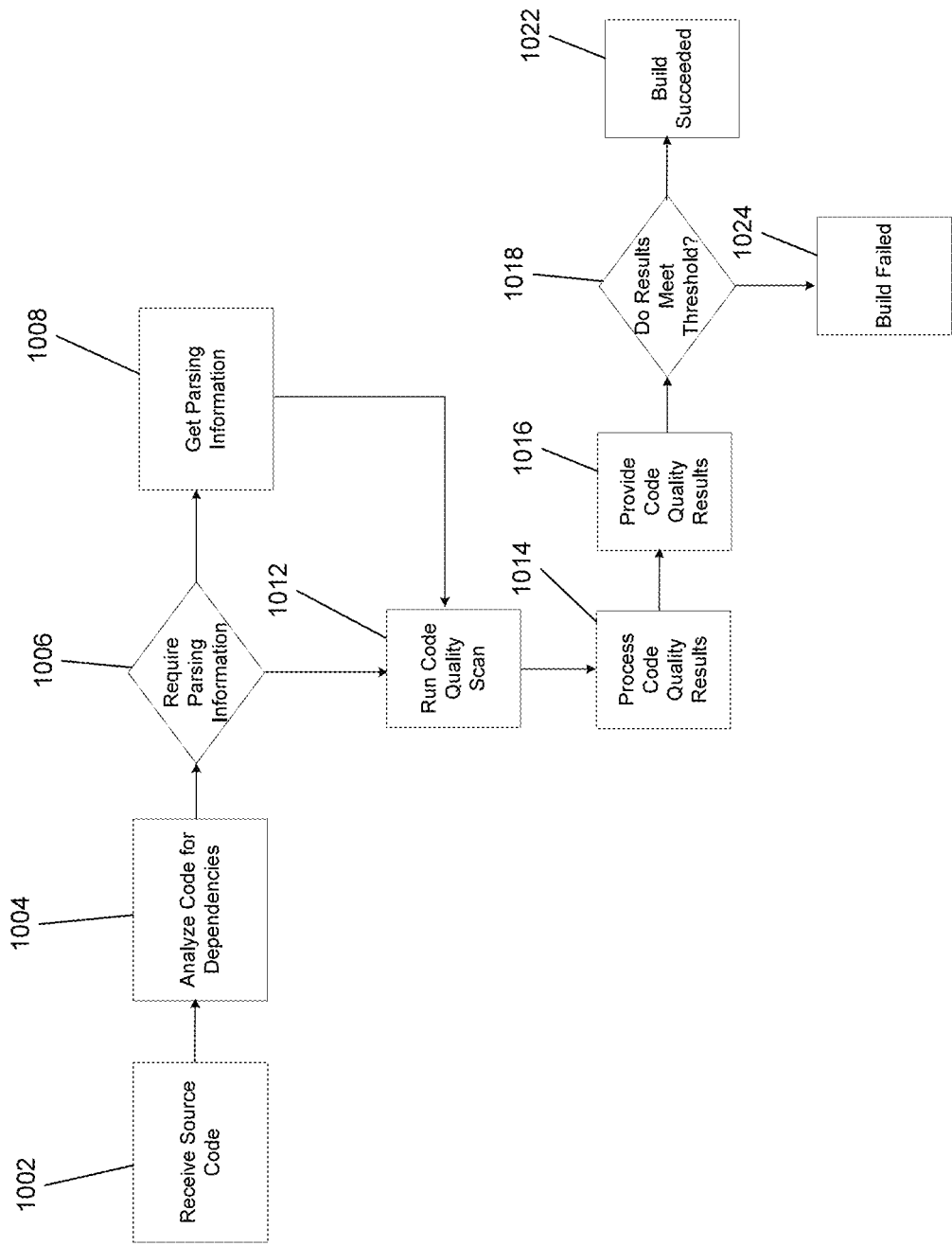
FIG. 10 is a flow diagram representing a code analysis process performed by the mainframe deployment system of FIG. 5.

FIG. 10 is a flow diagram representing a code analysis process performed by the mainframe deployment system 500 of FIG. 5. The mainframe deployment device 550 is also configured to perform a code dependency analysis. The mainframe deployment device 550 receives 1002 proposed source code and analyzes 1004 the code for dependencies. In some examples, the mainframe deployment device 550 determines 1006 whether it requires parsing information. In some examples parsing information may include data such as "copybooks" that are used to parse COBOL programs. The mainframe deployment device 550 gets 1008 such parsing information, if required, and applies it. The mainframe deployment device 550 runs 1012 a code quality scan to detect code quality issues including code smells, security vulnerabilities, and code bugs. In some examples, the mainframe deployment device 550 uses an external code review system running code inspection programs to perform the code quality scan. The mainframe deployment device 550 processes 1014 code quality results from the code quality scan and, if needed, updates the external code review system with the code quality results. The mainframe deployment device 550 also provides 1016 the code quality results to an approver. In some examples, the approver is a programmatic function that determines whether the code quality results satisfy programmatic criteria. In other examples, the approver is a human reviewer. The mainframe deployment device 550 receives a response from the approver regarding whether the code quality results meet 1018 a minimum code quality threshold. If the threshold is met, the build succeeds 1022 and the project continues. If the threshold is not met, the build fails 1024.

Figure 11:
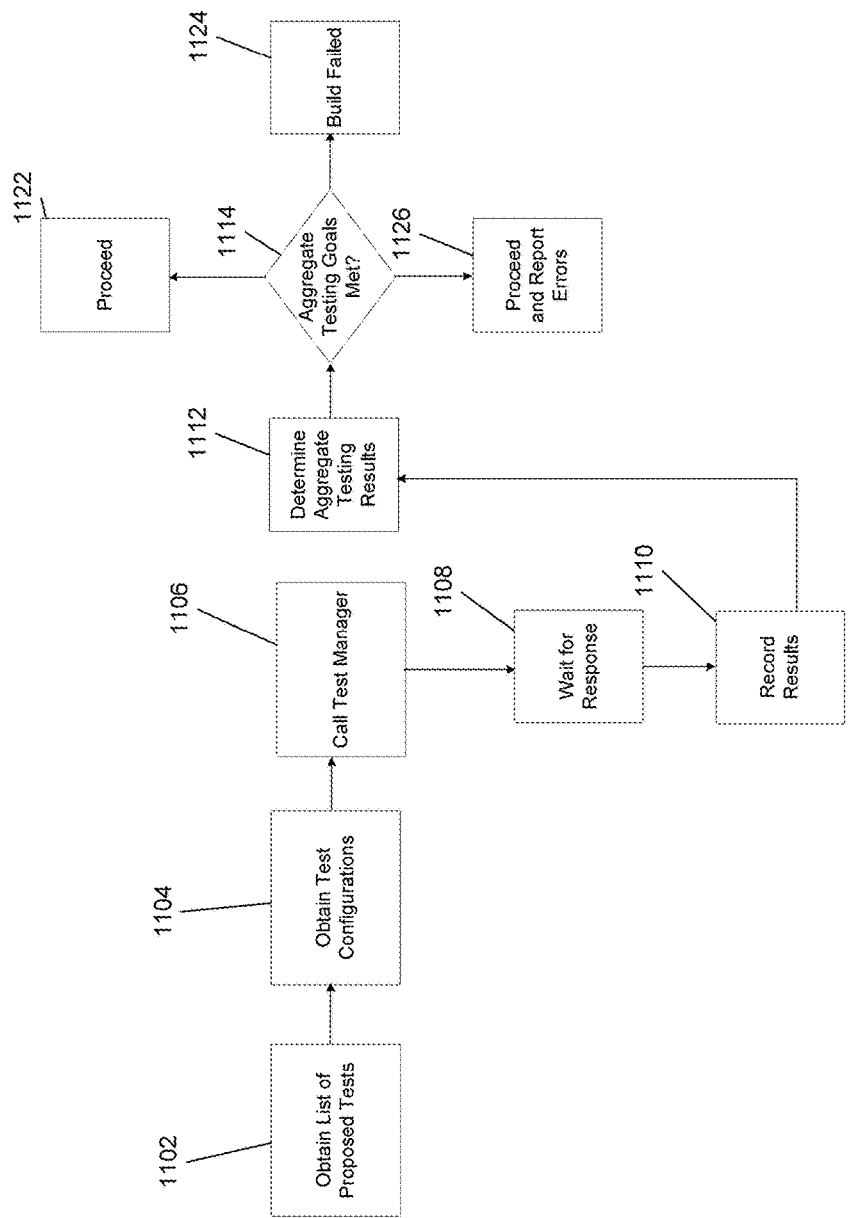
FIG. 11 is a flow diagram representing a pre-deployment test process performed by the mainframe deployment system of FIG. 5.

FIG. 11 is a flow diagram representing a pre-deployment test process performed by the mainframe deployment system 500 of FIG. 5. The mainframe deployment device 550 is also configured to request 640 that the at least one testing service 530 perform at least one set of code diagnostics to determine whether the code section satisfies build requirements. In some examples, the mainframe deployment device 550 requests that the at least one testing service 530 perform a pre-deployment test process. The testing service 530 obtains 1102 a list of proposed tests to be run on the proposed code. The testing service also obtains 1104 testing configurations associated with the obtained list of proposed tests. The testing service calls 1106 a test manager and requests that the test manager perform each of the tests in the list of proposed tests, pursuant to the test configurations. The testing service waits 1108 for the test manager response and records 1110 the results for each test. Results for each test may be indicated based on the amount of successful behaviors or unsuccessful behaviors for each test. The testing service determines 1112 aggregate testing results and determines 1114 whether the aggregate testing goals are met. If all tests completed without errors, bugs, or exceptions, the pre-deployments test process concludes and the mainframe deployment process proceeds 1122. If some tests were completed with errors, bugs, or exceptions, but the aggregate testing goals are met, the testing service reports the errors and the mainframe deployment process proceeds 1126. If the aggregate testing goals are not met, the build fails 1124.

Figure 12:
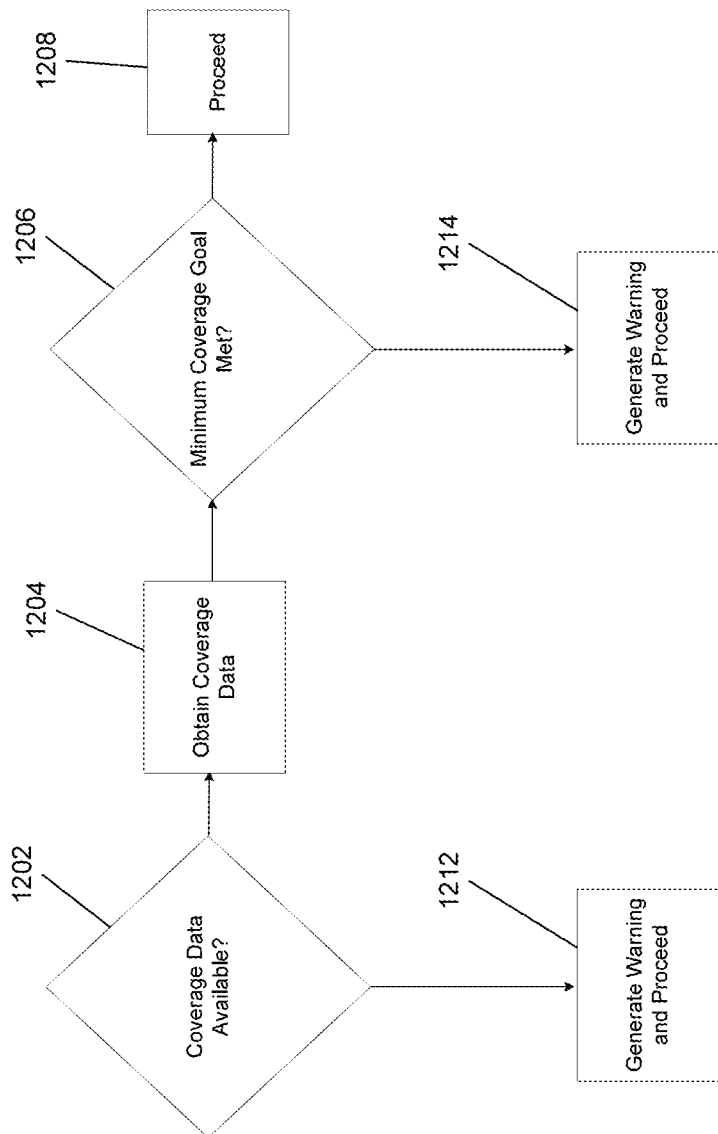
FIG. 12 is a flow diagram representing a code coverage analysis process performed by the mainframe deployment system of FIG. 5.

FIG. 12 is a flow diagram representing a code coverage analysis process performed by the mainframe deployment system 500 of FIG. 5. The mainframe deployment device 550 is configured to perform the code coverage analysis process after the testing process of FIG. 11. The mainframe deployment device 550 determines 1202 whether code coverage data is available. Code coverage data may be obtained during the pre-deployment test process described in FIG. 11 by determining the degree to which the source code was executed when the tests of the pre-deployment test process were run. If code coverage data is not available, the mainframe deployment device 550 generates a warning and proceeds 1212. If code coverage data is available, the mainframe deployment device 550 obtains 1204 the code coverage data and determines 1206 whether a minimum code coverage goal is met by comparing the code coverage data to a minimum threshold for code coverage. If the minimum code coverage goal is met, the mainframe deployment device 550 proceeds 1208. If the minimum code coverage goal is not met, the mainframe deployment device 550 generates a warning, and proceeds 1214.

Figure 13:
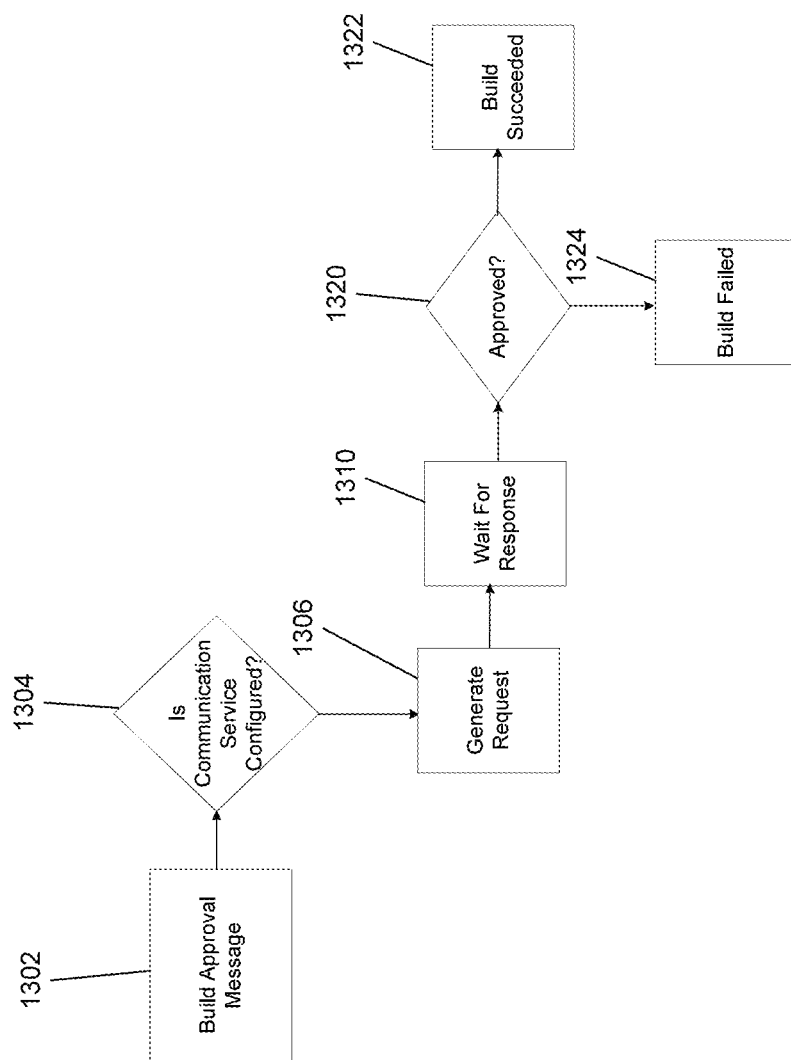
FIG. 13 is a flow diagram representing an approval process performed by the mainframe deployment system of FIG. 5.

FIG. 13 a flow diagram representing an approval process performed by the mainframe deployment system 500 of FIG. 5. The mainframe deployment device 550 is configured to perform the approval process. The mainframe deployment device 550 generates a build approval message 1302 to be provided to an approver. The mainframe deployment device 550 determines 1304 whether at least one communication service is configured. In some instances, the communication service may be, for example, an instant messaging service for use in project management. In other instances, the communication service may be any other suitable electronic messaging service including, for example, e-mail. If the communication service is configured, the mainframe deployment device 550 generates 1306 a request to be sent to the approver through the communications service (including, for example, e-mail or instant messaging). The mainframe deployment device 550 waits 1310 for a response from the approver. The mainframe deployment device 550 determines 1320 whether the response is an approval. If the response is an approval, the build succeeds 1322 through this phase and the mainframe deployment device 550 proceeds. If the response is not an approval or if the response comes after a time-out, the build fails 1324. As such, a build can only proceed if an approver approves of the build within the pre-determined time-out window.

Figure 14:
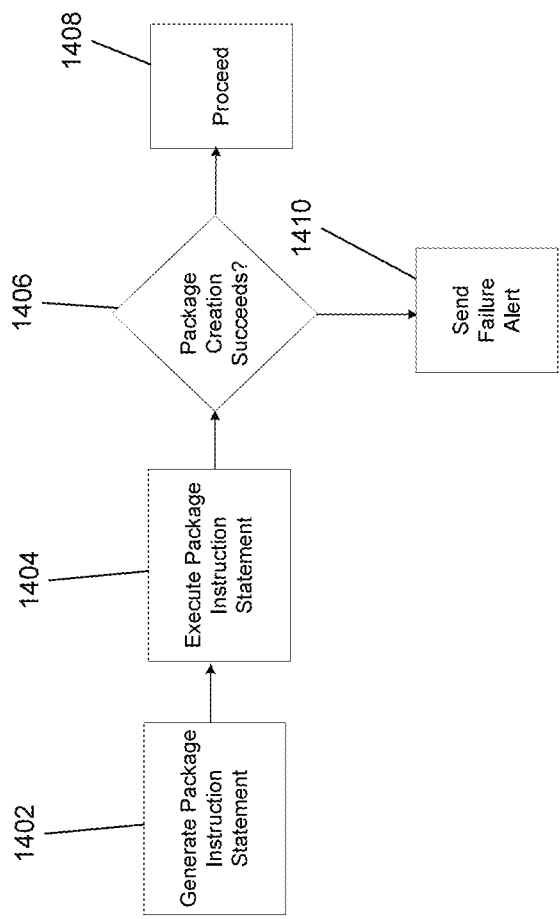
FIG. 14 is a flow diagram representing a build package creation process performed by the mainframe deployment system of FIG. 5.

FIG. 14 a flow diagram representing a build package creation process performed by the mainframe deployment system 500 of FIG. 5. The mainframe deployment device 550 is configured to perform the build package creation process. The mainframe deployment device 550 generates 1402 a package instruction statement. As used herein, a package instruction statement is control information for a code release that may be used to generate a package. The mainframe deployment device 550 may pre-process the package instruction statement prior to attempting to create a package based on it. For example, if the package instruction statement is associated with a particular requirement (e.g., COBOL 6 may require a processor group), the package instruction statement is adjusted to address such a requirement. The mainframe deployment device 550 attempts to create 1404 a package based on the package instruction statement. The mainframe deployment device 550 determines 1406 whether the package was created successfully. If the mainframe deployment 550 device successfully creates the package, the build succeeds through this stage and the mainframe deployment device proceeds 1408. If the mainframe deployment device fails to create the package, the build fails and the mainframe deployment device sends a failure alert 1410.

Figure 15:
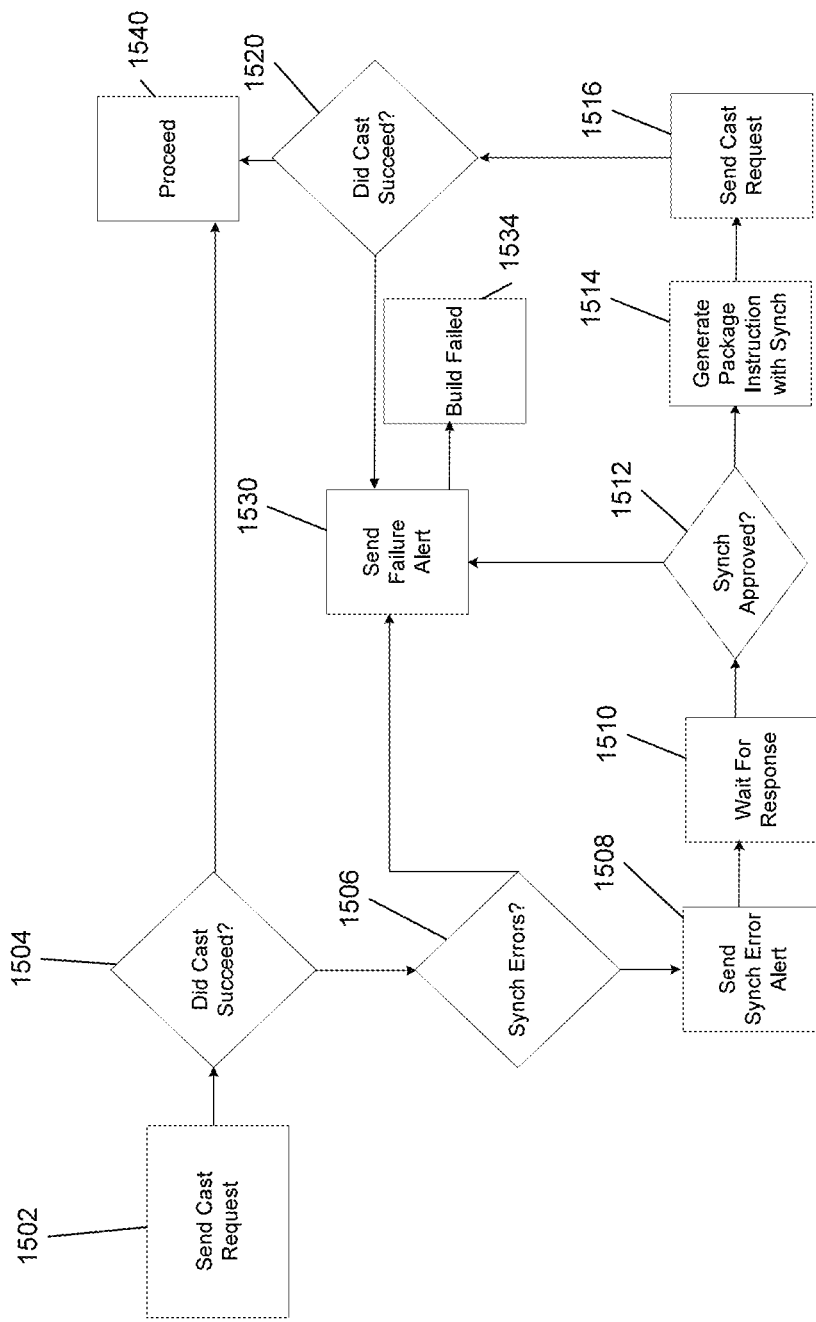
FIG. 15 is a flow diagram representing a package casting process performed by the mainframe deployment system of FIG. 5.

FIG. 15 is a flow diagram representing a package casting process performed by the mainframe deployment system 500 of FIG. 5. The mainframe deployment device 550 is configured to perform the package casting process. The mainframe deployment device 550 sends a cast request 1502 and determines 1504 whether the casting succeeded. If the casting succeeded, the mainframe deployment device 550 proceeds 1540 and the build continues through this stage. If the casting fails, the mainframe deployment device 550 determines 1506 whether the casting resulted in synchronization errors. If the casting failed and there were not synchronization errors, the mainframe deployment device 550 determines that there was a failure, sends a failure alert 1530, and the build fails 1534. If the casting failed and there were synchronization errors, the mainframe deployment device 550 sends an error alert message 1508 to an approver and waits 1510 for input approving the build over the synchronization failures. The mainframe deployment device 550 determines 1512 whether the synchronization failures were approved within a time-out window. If the mainframe deployment device 550 fails to receive a response to the input within the time-out window or if the input received is a rejection of approval, the mainframe deployment device 550 determines that that there was a failure, sends a failure alert 1530, and the build fails 1534. If the mainframe deployment device 550 receives an approval response to the input within the time-out window, the package instruction statement is updated 1514 to reflect the approval and the mainframe deployment device 550 sends 1516 a cast request. If the casting succeeded, the mainframe deployment device 550 determines 1520 that the casting succeeded, proceeds 1540 and the build continues through this stage. If the casting fails, the mainframe deployment device 550 determines 1520 that that there was a failure, sends a failure alert 1530, and the build fails 1534.

Figure 16:
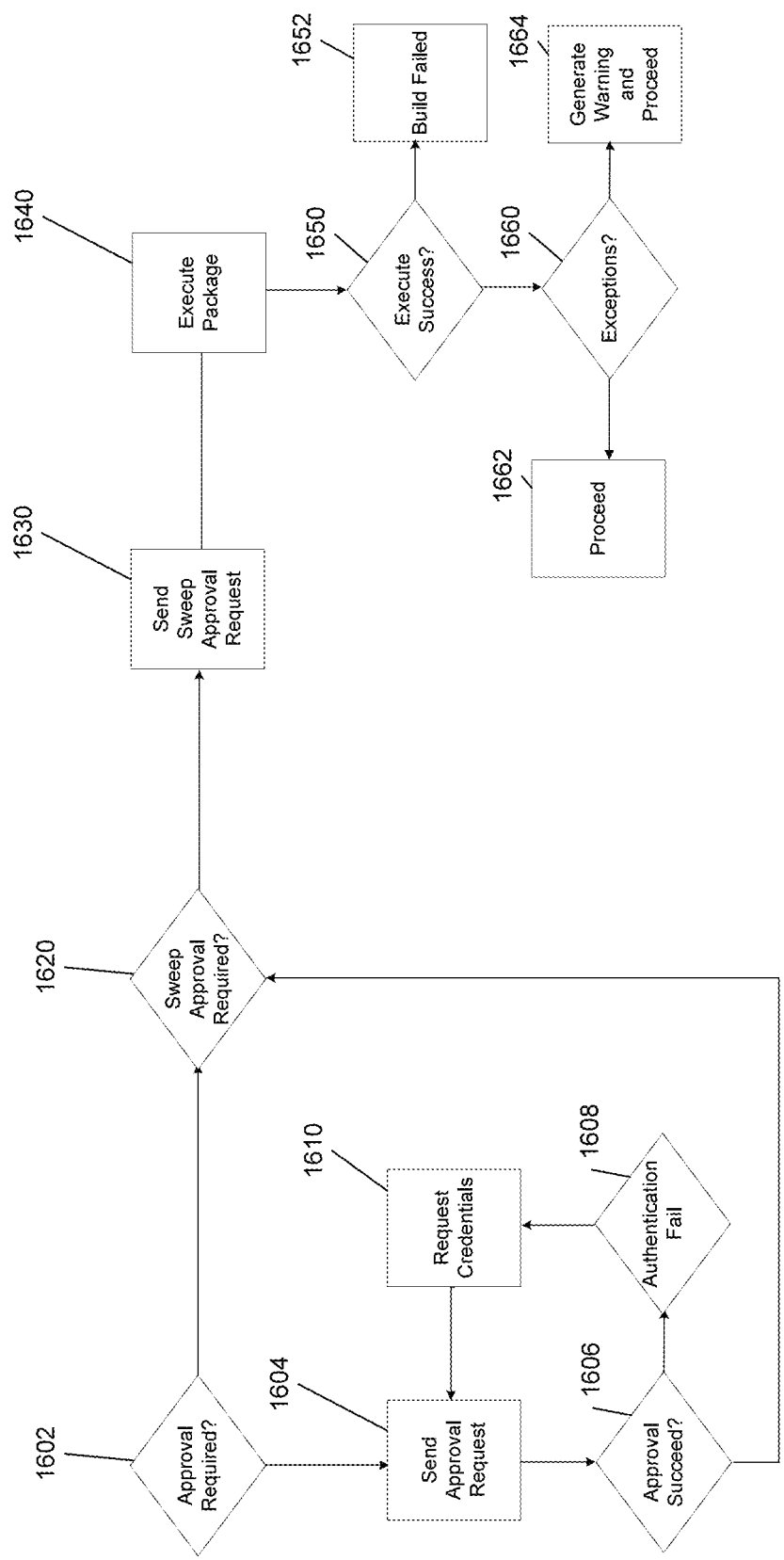
FIG. 16 is a flow diagram representing a package execution process performed by the mainframe deployment system of FIG. 5.

FIG. 16 is a flow diagram representing a package execution process performed by the mainframe deployment system 500 of FIG. 5. The mainframe deployment device 550 is configured to perform the package execution process. The mainframe deployment device 550 determines 1602 whether approval is required prior to deployment. If the mainframe deployment device 550 determines that approval is required, the mainframe deployment device 550 sends 1604 a request for approval and determines 1606 whether approval was received. If approval is not successfully received, the mainframe deployment device 550 determines 1608 that authentication failed and re-requests 1610 credentials for approval. If the mainframe deployment device 550 determines 1606 that approval was received, or determines 1602 that approval was not required, the mainframe deployment device 550 determines 1620 whether sweep approval is required. If sweep approval is required, the mainframe deployment device 550 sends a request 1630 for sweep approval and determines whether sweep approval was received. After sweep approval is received (or if it is not required), the mainframe deployment device 550 executes 1640 the package and determines 1650 whether it was successful. If the package execution is not determined to be successful, the build fails 1652. If the package execution was successful, the mainframe deployment device 550 determines 1660 whether the package execution resulted in exceptions. If the mainframe deployment device 550 determines 1660 the package execution did not create exceptions, the mainframe deployment device proceeds 1662. If the mainframe deployment device 550 determines 1662 the package execution created exceptions, the mainframe deployment device 550 generates a warning and proceeds 1664.

Figure 17:
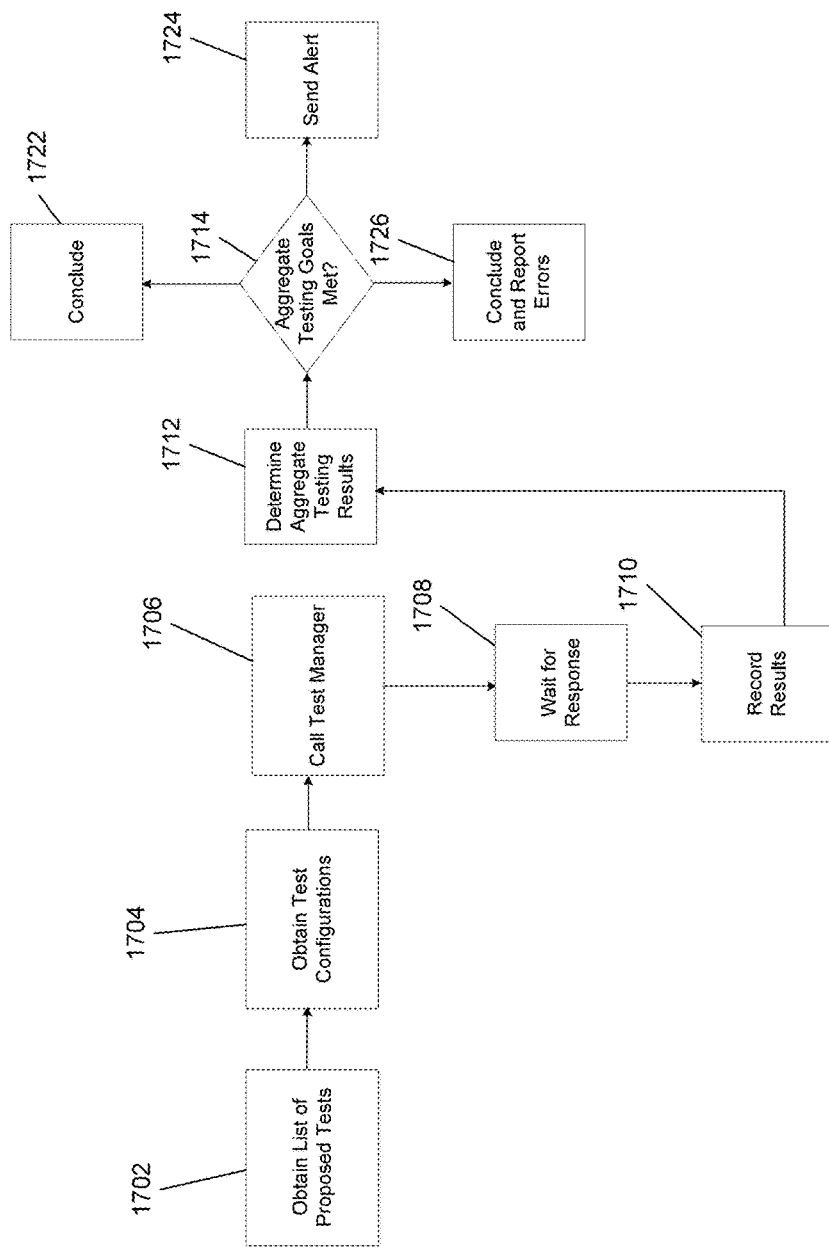
FIG. 17 is a flow diagram representing a post-deployment test process performed by the mainframe deployment system of FIG. 5.

FIG. 17 is a flow diagram representing a post-deployment test process performed by the mainframe deployment system 500 of FIG. 5. The mainframe deployment device 550 is also configured to request that the testing service 530 perform a post-deployment test process. The testing service 530 obtains 1702 a list of proposed tests to be run on the deployed code. The testing service 530 also obtains 1704 testing configurations associated with the obtained list of proposed tests. The testing service 530 calls 1706 a test manager and requests that the test manager perform each of the tests in the list of proposed tests, pursuant to the test configurations. The testing service waits 1708 for the test manager response and records 1710 the results for each test. Results for each test may be indicated based on the amount of successful behaviors or unsuccessful behaviors for each test. The testing service 530 determines 1712 aggregate testing results and determines 1714 whether the aggregate testing goals are met. If all tests completed without errors, bugs, or exceptions, the post-deployments test process concludes 1722. If some tests were completed with errors, bugs, or exceptions, but the aggregate testing goals are met, the testing service reports the errors and the process concludes 1726. If the aggregate testing goals are not met, the testing service 530 generates an alert.

Figure 18:
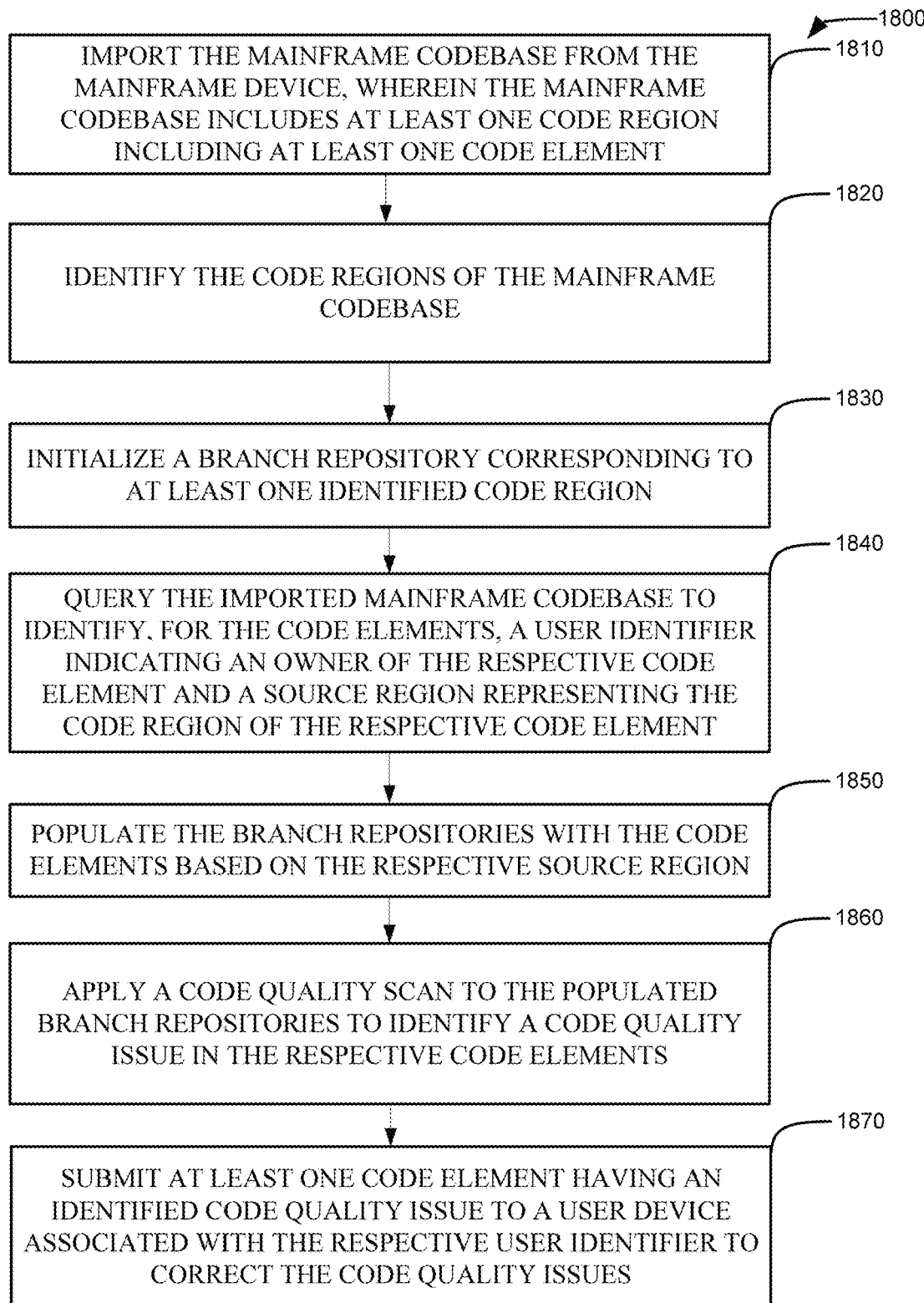
FIG. 18 is a flow diagram representing a method for maintaining and securing mainframe codebases performed by the mainframe deployment device of the mainframe deployment system shown in FIG. 5.

FIG. 18 is a flow diagram 1800 representing a method for maintaining and securing mainframe codebases performed by the mainframe deployment device 550 of the mainframe deployment system 500 (shown in FIG. 5). The processor of the mainframe deployment device 550 is configured to import 1810 the mainframe codebase from the mainframe device, wherein the mainframe codebase includes at least one code region including at least one code element. The processor of the mainframe deployment device 550 is also configured to identify 1820 the at least one code region of the mainframe codebase and to initialize 1830 a branch repository corresponding to at least one identified code region. The processor of the mainframe deployment device 550 is also configured to query 1840 the imported mainframe codebase to identify, for the code elements, a user identifier indicating an owner of the respective code element and a source region representing the code region of the respective code element. The processor of the mainframe deployment device 550 is also configured to populate 1850 the branch repositories with the code elements based on the respective source region. The processor of the mainframe deployment device 550 is also configured to apply 1860 a code quality scan to the populated branch repositories to identify a code quality issue in the respective code elements. The processor of the mainframe deployment device 550 is also configured to submit 1870 at least one code element having an identified code quality issue to a user device associated with the respective user identifier to correct the code quality issues.

Figure 19:
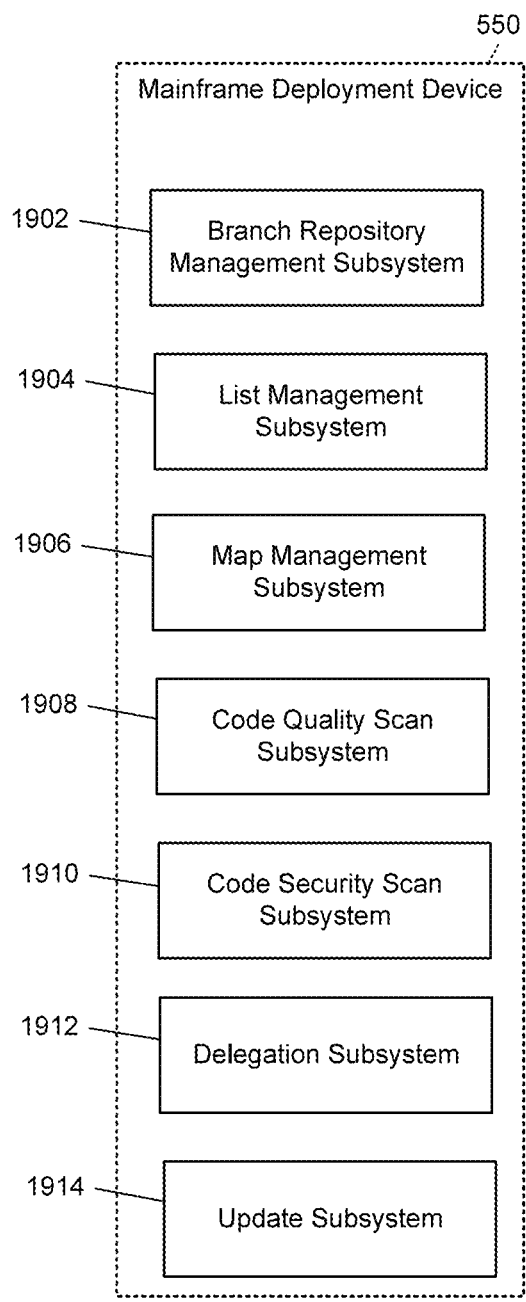
FIG. 19 is a diagram of elements of one or more example computing devices that may be used in the system shown in FIGS. 1-5.

FIG. 19 is a diagram of elements of one or more example computing devices that may be used in the system shown in FIGS. 1-5. As described herein, the elements 1902, 1904, 1906, 1908, 1910, 1912, and 1914 are configured to perform the processes and methods described herein. Branch repository management subsystem 1902 is configured to initialize, populate, update, and manage the branch repositories. List management subsystem 1904 is configured to provide the functions of generating, updating, and utilizing the list of code elements described herein. Map management subsystem 1906 is configured to generate maps used to assign code elements to users for review. Code quality scan subsystem 1908 is configured to perform scans to identify code quality issues, determine code quality types, determine code quality issue severity, and determine code quality scores and metrics. Code security system 1910 is configured to perform scans to identify sensitive information that may pose a security issue, to determine code security types, determine code security issue severity, and determine code security scores and metrics. Delegation subsystem 1912 is configured to manage user assignment of code elements to review and correct. Update subsystem 1914 is configured to update code branches and mainframe codebases based on updated code elements received from users.

Figure 20:
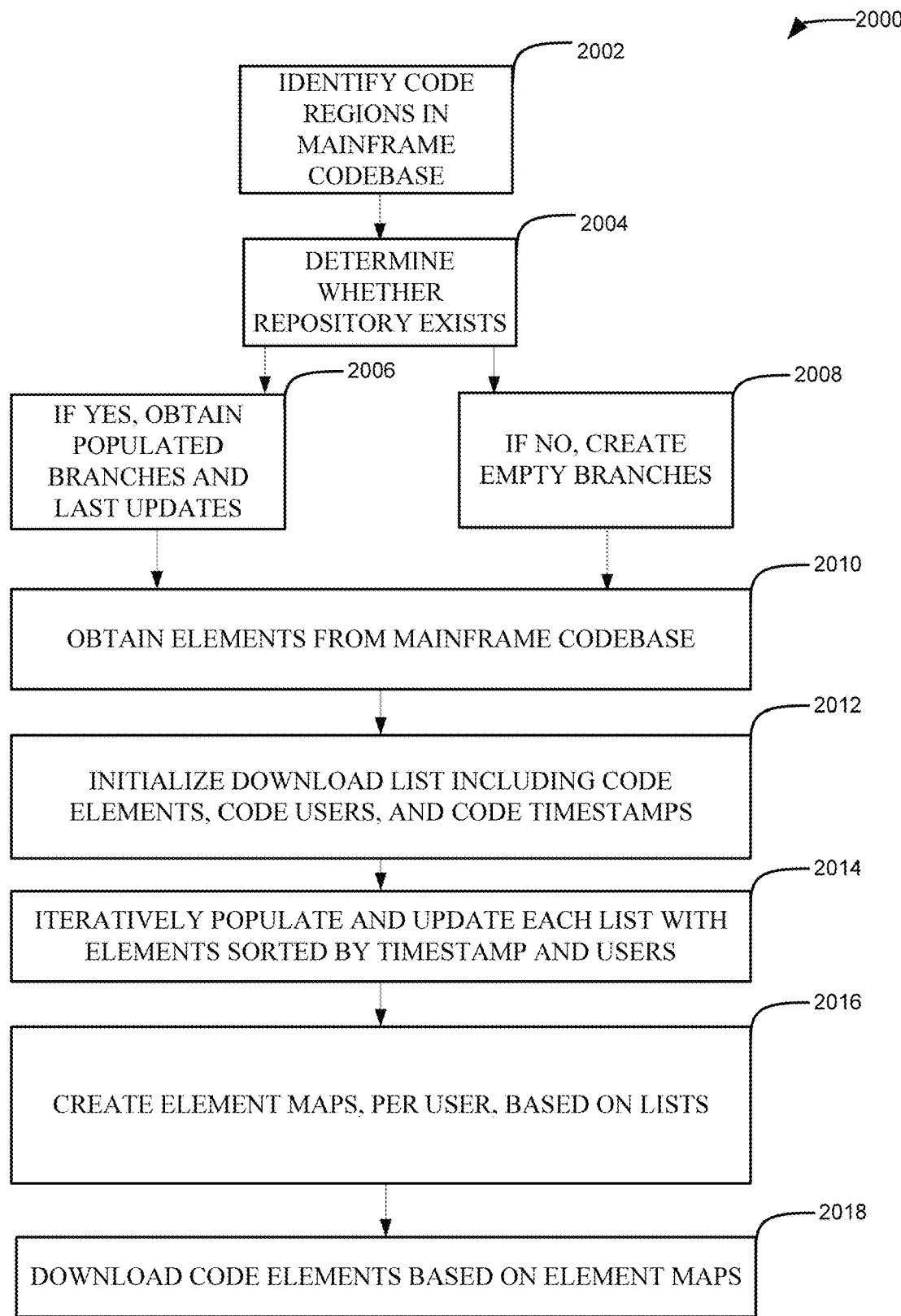
FIG. 20 is a flow diagram of a process performed by the mainframe deployment device to provide maintenance, testing, and quality assurance ("QA") to a mainframe codebase.

FIG. 20 is a flow diagram 2000 of a process performed by the mainframe deployment device to provide maintenance, testing, and QA to a mainframe codebase. Generally, diagram 2000 illustrates the process of importing mainframe codebases, populating branch repositories, and generating lists and maps. Mainframe deployment device 550 is configured to scan a mainframe codebase on the mainframe device and identify 2002 code regions. Mainframe deployment device 550 determines 2004 whether a corresponding branch repository exists for each code region identified. If yes, mainframe deployment device 550 obtains 2006 populated branches and most recent updates. If no, mainframe deployment device 550 creates 2008 empty branches for the repository. Mainframe deployment device 550 obtains 2010 elements from a mainframe codebase and initializes 2012 a download list including code elements, code users, and code timestamps. Mainframe deployment device 550 iteratively populates and updates 2014 each list of element details with code element records sorted by timestamp and user. In some examples, mainframe deployment device 550 also populates and updates each corresponding branch repository. Mainframe deployment device 550 creates 2016 code element maps based on the list of code element details and downloads 2018 elements based on element maps. Mainframe deployment device 550 may also delegate or assign code elements that are downloaded based on the user maps and manage such delegation. In some examples, mainframe deployment device 550 also receives corrected code elements and updates the mainframe codebase.

Figure 21:
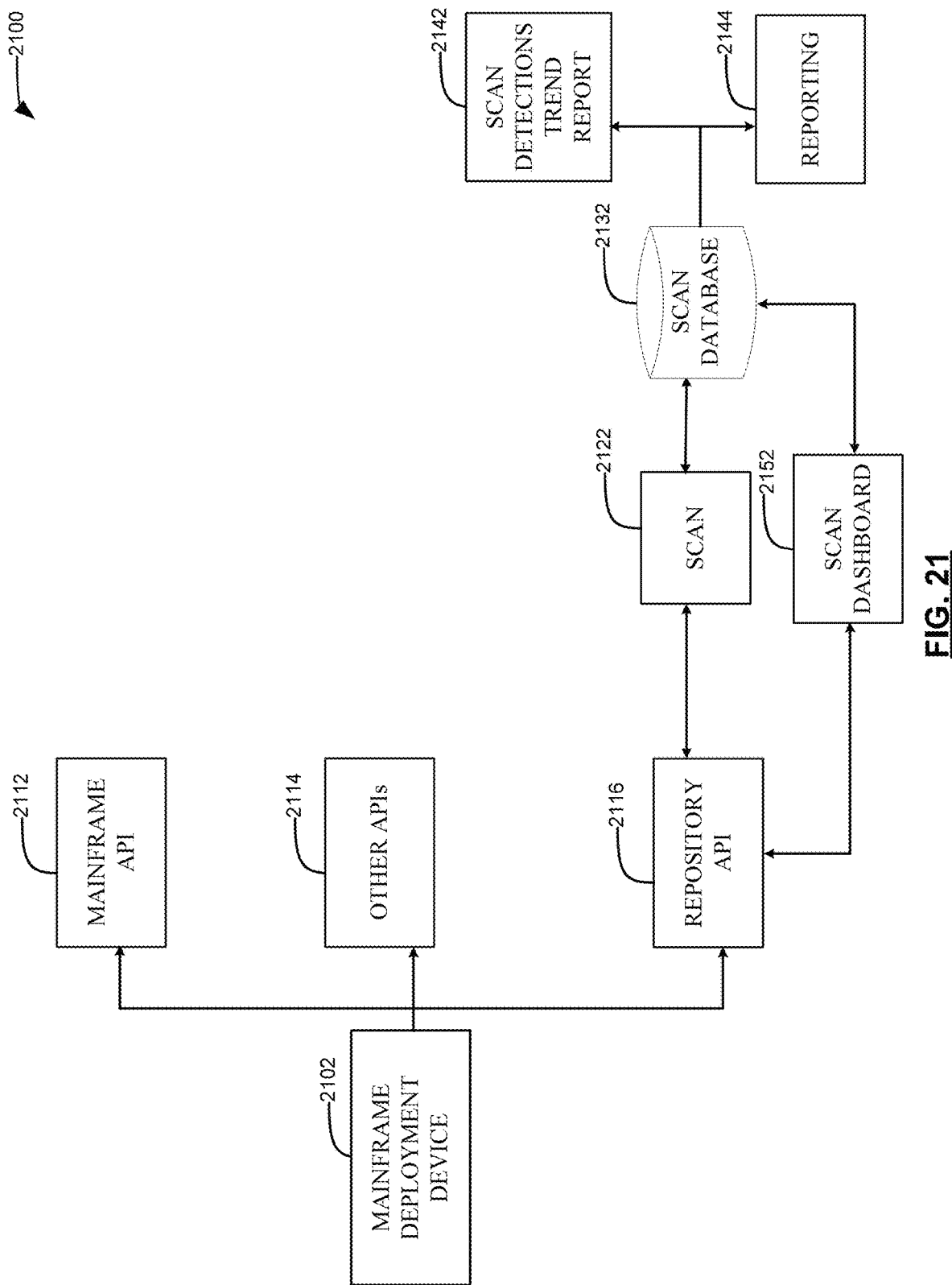
FIG. 21 is a flow diagram of a process performed by the mainframe deployment device to secure a mainframe codebase.

FIG. 21 is a flow diagram of a process 2100 performed by the mainframe deployment device 550 to secure a mainframe codebase. In the illustrated example, mainframe deployment device 550 (shown here as mainframe deployment device 2102) accesses multiple interfaces including a mainframe service application programmer interface ("API") 2112, other APIs 2114, and repository APIs 2116. In some examples, repository APIs 2116 may provide services including code security scans, code quality scans, and related services. In other examples, such services are available natively on mainframe deployment device 550 or through other devices. Mainframe deployment device 550 calls code security scan 2122 which provides the services described above. Scan 2122 also publishes scan results to scan database 2132 which may be used to drive scan detections trend reporting 2142 (to identify, for example, increases or changes in rates of sensitive information in mainframe codebases) or reporting 2144 (to show, for example, aggregate statistics and data regarding sensitive information). Scan database 213 may also be in communication with an application for a scan dashboard 2152 used to update a user about code security scans.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A quality assurance system for maintenance and security of mainframe codebases, comprising:
    a mainframe device including a mainframe processor and a mainframe memory, wherein said mainframe memory includes a mainframe codebase; and
    a mainframe deployment device including a processor and a memory device, wherein the mainframe deployment device is in communication with the mainframe device, wherein the processor is configured to:
        initialize a branch repository corresponding to at least one code region of the mainframe codebase, wherein the at least one code region includes at least one code element;
        identify, for the at least one code element of the at least one code region, a timestamp indicating a creation time of the at least one code element and a user identifier indicating an owner of the at least one code element;
        populate the branch repository with the at least one code element based on the at least one code region and the timestamp;
        apply a code security scan to the populated branch repository to identify a code security issue in the at least one code element and resolve the identified code security issue in the at least one code element; and
        apply a code quality scan to the populated branch repository to identify a code quality issue in the at least one code element, assign the at least one code element to the user identifier based at least partially on the timestamp, and route the at least one code element along with information regarding the identified code quality issue to a user device associated with the user identifier to correct the identified code quality issue in the at least one code element.

2. The system of claim 1, wherein the processor is further configured to apply the code quality scan to the populated branch repository to identify that the code quality issue in the at least one code element includes a code smell posing a maintenance issue.

3. The system of claim 1, wherein the processor is further configured to apply the code quality scan to the populated branch repository to identify that the code quality issue in the at least one code element includes a code bug causing a reliability or performance issue.

4. The system of claim 1, wherein the processor is further configured to apply the code quality scan to the populated branch repository to identify that the code quality issue in the at least one code element includes a code vulnerability that may be improperly exploited by a third party.

5. The system of claim 1, wherein the processor is further configured to apply the code quality scan to the populated branch repository to identify that the code quality issue in the at least one code element includes a code hot spot that can expose sensitive information or allow intrusion.

6. The system of claim 1, wherein the processor is further configured to apply the code quality scan to the populated branch repository to determine a severity associated with the code quality issue, wherein the severity includes one of a blocker code issue that causes significant adverse impact, a critical code issue that may cause significant adverse impact, a major code issue that causes minor adverse impact, or a minor code issue that causes minor adverse impact.

7. The system of claim 1, wherein the processor is further configured to apply the code quality scan to the populated branch repository to generate statistics associated with the code quality issue including at least one of a quantity of code smells, a quantity of code bugs, a quantity of code vulnerabilities, a quantity of code hot spots, an estimated technical debt indicating an estimated effort to resolve the code quality issue, a maintainability rating indicating an estimated remediation cost for resolving the code quality issue as compared to an estimated cost of developing the mainframe codebase, or a reliability rating indicating a proportion of the code quality issue determined to cause significant adverse impact.

8. The system of claim 1, wherein the processor is further configured to route the at least one code element having the identified code quality issue along with the information regarding the identified code quality issue, wherein the information includes instructions on how to remediate the code quality issue.

9. The system of claim 1, wherein the processor is further configured to apply the code security scan to the populated branch repository to resolve the identified code security issue in the at least one code element by altering the at least one code element.

10. The system of claim 1, wherein the processor is further configured to apply the code security scan to the populated branch repository to identify the code security issue in the at least one code element, wherein the identified code security issue includes a presence of sensitive information in at least one of an access token, a secret, a password, a key, a login credential, or a credentialing certificate.

11. The system of claim 1, wherein the processor is further configured to apply the code security scan to the populated branch repository to determine a severity associated with the code security issue, wherein the severity is one of low risk, medium risk, or high risk.

12. A mainframe deployment device for providing mainframe codebase maintenance and security, the mainframe deployment device including a processor and a memory device, the mainframe deployment device in communication with a mainframe device including a mainframe processor and a mainframe memory, the mainframe memory including a mainframe codebase, wherein the processor is configured to:
initialize a branch repository corresponding to at least one code region of the mainframe codebase, wherein the at least one code region includes at least one code element;
identify, for the at least one code element of the at least one code region, a timestamp indicating a creation time of the at least one code element and a user identifier indicating an owner of the at least one code element;
populate the branch repository with the at least one code element based on the at least one code region and the timestamp;
apply a code security scan to the populated branch repository to identify a code security issue in the at least one code element and resolve the identified code security issue in the at least one code element; and
apply a code quality scan to the populated branch repository to identify a code quality issue in the at least one code element, assign the at least one code element to the user identifier based at least partially on the timestamp, and route the at least one code element along with information regarding the identified code quality issue to a user device associated with the user identifier to correct the identified code quality issue in the at least one code element.

13. The mainframe deployment device of claim 12, wherein the processor is further configured to apply the code quality scan to the populated branch repository to identify the code quality issue in the at least one code element, wherein the identified code quality issue includes at least one of a code smell, a code bug, a code vulnerability, and a code hot spot.

14. The mainframe deployment device of claim 12, wherein the processor is further configured to apply the code quality scan to the populated branch repository to determine a severity associated with the code quality issue, wherein the severity includes one of a blocker code issue that causes significant adverse impact, a critical code issue that causes significant adverse impact, a major code issue that causes minor adverse impact, or a minor code issue that causing minor adverse impact.

15. The mainframe deployment device of claim 12, wherein the processor is further configured to apply the code quality scan to the populated branch repository to generate statistics associated with the code quality issue including at least one of a quantity of code smells, a quantity of code bugs, a quantity of code vulnerabilities, a quantity of code hot spots, an estimated technical debt indicating an estimated effort to resolve the code quality issue, a maintainability rating indicating an estimated remediation cost for resolving the code quality issue as compared to an estimated cost of developing the mainframe codebase, or a reliability rating indicating a proportion of the code quality issue determined to cause significant adverse impact.

16. The mainframe deployment device of claim 12, wherein the processor is further configured to route the at least one code element having the identified code quality issue along with the information regarding the identified code quality issue, wherein the information includes instructions on how to remediate the code quality issue.

17. The mainframe deployment device of claim 12, wherein the processor is further configured to apply the code security scan to the populated branch repository to resolve the identified code security issue in the at least one code element by altering the at least one code element.

18. The mainframe deployment device of claim 12, wherein the processor is further configured to apply the code security scan to the populated branch repository to identify the code security issue in the at least one code element, wherein the identified code security issue includes a presence of sensitive information in at least one of an access token, a secret, a password, a key, a login credential, or a credentialing certificate.

19. The mainframe deployment device of claim 12, wherein the processor is further configured to apply the code security scan to the populated branch repository to determine a severity associated with the code security issue, wherein the severity is one of low risk, medium risk, or high risk.

20. A method for providing mainframe codebase maintenance and security, the method performed by a mainframe deployment device including a processor and a memory device, the method comprising:
    initializing a branch repository corresponding to at least one code region of the mainframe codebase, wherein the at least one code region includes at least one code element;
    identifying, for the at least one code element of the at least one code region, a timestamp indicating a creation time of the at least one code element and a user identifier indicating an owner of the at least one code element;
    populating the branch repository with the at least one code element based on the at least one code region and the timestamp;
    applying a code security scan to the populated branch repository to identify a code security issue in the at least one code element and resolve the identified code security issue in the at least one code element; and
    applying a code quality scan to the populated branch repository to identify a code quality issue in the at least one code element, assign the at least one code element to the user identifier based at least partially on the timestamp, and route the at least one code element along with information regarding the identified code quality issue to a user device associated with the user identifier to correct the identified code quality issue in the at least one code element.

* * * * *